(12) United States Patent
Sidiropoulos

(10) Patent No.: US 11,783,711 B2
(45) Date of Patent: *Oct. 10, 2023

(54) AIRSPACE INFORMATION MODELING AND DESIGN

(71) Applicant: Vianair Inc., Wilmington, DE (US)

(72) Inventor: Stavros Sidiropoulos, New York, NY (US)

(73) Assignee: VIANAIR INC., New York, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/456,822

(22) Filed: Nov. 29, 2021

(65) Prior Publication Data

US 2022/0157176 A1    May 19, 2022

Related U.S. Application Data

(63) Continuation of application No. 16/676,256, filed on Nov. 6, 2019, now Pat. No. 11,189,177.

(Continued)

(51) Int. Cl.
*G08G 5/00* (2006.01)
*G06Q 10/0639* (2023.01)
(Continued)

(52) U.S. Cl.
CPC ....... *G08G 5/0017* (2013.01); *G06Q 10/0631* (2013.01); *G06Q 10/06393* (2013.01);
(Continued)

(58) Field of Classification Search
CPC .... G08G 5/0017; G08G 5/0026; G08G 5/003; G08G 5/0043; G08G 5/0082;
(Continued)

(56) References Cited

U.S. PATENT DOCUMENTS

| | | | |
|---|---|---|---|
| 11,189,177 B2* | 11/2021 | Sidiropoulos | G06Q 10/06393 |
| 2005/0090978 A1* | 4/2005 | Bathory | G08G 7/00 701/3 |
| 2006/0191326 A1* | 8/2006 | Smith | G01H 17/00 73/73 |
| 2009/0012660 A1* | 1/2009 | Roberts | G08G 5/045 701/3 |
| 2009/0112645 A1* | 4/2009 | Jha | G06Q 50/30 705/7.12 |

(Continued)

FOREIGN PATENT DOCUMENTS

| | | | |
|---|---|---|---|
| CN | 113962015 A * | 1/2022 | G06F 30/15 |
| JP | 2012220132 A | 11/2012 | |

(Continued)

OTHER PUBLICATIONS

International Search Report and Written Opinion dated Apr. 8, 2020 for International Patent Application No. PCT/US19/60108, of Vianair Inc., 13 pages.

*Primary Examiner* — Dale W Hilgendorf
(74) *Attorney, Agent, or Firm* — Perkins Coie LLP

(57) ABSTRACT

Methods and systems for efficient airspace design and planning using the Airspace Information Model are described. In one example aspect, a method for designing an improved airspace model includes receiving a first user input that comprises one or more parameters, generating, based on the first user input, an airspace design, performing a validation of the airspace design against an aviation standard, the validation comprising a set of design rules and criteria for evaluation of aircraft performance and safety of operations, generating, based on at least the parametric model, at least one key performance indicator (KPI) for the airspace design, providing for display a value of the at least one KPI, receiving a second user input that comprises an updated value for at least one of the one or more parameters, and providing for display, based on the second input, an updated value of the at least one KPI.

20 Claims, 15 Drawing Sheets

Related U.S. Application Data

(60) Provisional application No. 62/756,433, filed on Nov. 6, 2018.

(51) Int. Cl.
  | | |
  |---|---|
  | *G06Q 10/0631* | (2023.01) |
  | *G07C 5/08* | (2006.01) |
  | *B64D 45/00* | (2006.01) |
  | *G06Q 50/30* | (2012.01) |

(52) U.S. Cl.
  CPC ............ *G08G 5/003* (2013.01); *G08G 5/0026* (2013.01); *G08G 5/0043* (2013.01); *B64D 45/00* (2013.01); *G06Q 50/30* (2013.01); *G07C 5/0816* (2013.01); *G08G 5/0082* (2013.01); *G08G 5/0091* (2013.01)

(58) Field of Classification Search
  CPC ............ G08G 5/0091; G06Q 10/0631; G06Q 10/06393; G06Q 50/30; B64D 45/00; G07C 5/0816
  See application file for complete search history.

(56) References Cited

U.S. PATENT DOCUMENTS

| | | | |
|---|---|---|---|
| 2012/0245836 A1* | 9/2012 | White | G08G 5/06 701/120 |
| 2013/0138275 A1 | 5/2013 | Nauman et al. | |
| 2014/0033065 A1 | 1/2014 | Brou et al. | |
| 2016/0203722 A1 | 7/2016 | Liao et al. | |
| 2016/0275801 A1* | 9/2016 | Kopardekar | G08G 5/0013 |
| 2017/0352281 A1* | 12/2017 | Donovan | G06F 9/44 |
| 2018/0261103 A1* | 9/2018 | de Oliveira | G08G 5/0008 |
| 2019/0391909 A1* | 12/2019 | Pesquet-Popescu | G08G 5/0043 |

FOREIGN PATENT DOCUMENTS

| | | | | |
|---|---|---|---|---|
| JP | 2014019431 A | | 2/2014 | |
| KR | 101877900 B1 | | 7/2018 | |
| WO | 2017173417 A1 | | 10/2017 | |
| WO | WO-2017173417 A1 | * | 10/2017 | ............ G08G 5/0021 |
| WO | 2020097230 A1 | | 5/2020 | |

* cited by examiner

| Rule Validity | Rule Description | Enforcement Type | Source | Version | Paragraph |
|---|---|---|---|---|---|
| Valid | The Initial Climb Area (ICA) may be extended beyond 2NM to a maximum length of 10NM | Mandatory | TERPS | 8260.3D | 14-6-1.b.1 |
| Valid | Departure Procedure Obstacle Clearance is based on a minimum climb gradient performance of 200ft/NM | Mandatory | TERPS | 8260.3D | 14-1-4 |
| Valid | Climb gradients in excess of 500ft/NM require approval | Requires Approval | TERPS | 8260.3D | 14-3-4 |
| First leg alignment is 15.9 degrees. It must be a straight route (no more than 15 degrees alignment) | Required obstacle clearance is based on climbing to 400ft above the DER elevation before making the initial turn | Mandatory | Instrument Procedures Handbook | 8083.16B | Chapter 1 |

FIG. 5

AIRSPACE INFORMATION MODELING AND DESIGN

CROSS-REFERENCE TO RELATED APPLICATION

This patent document is a continuation of U.S. patent application Ser. No. 16/676,256, filed Nov. 6, 2019, now U.S. Pat. No. 11,189,177, issued on Nov. 30, 2021, which claims priority to and benefits of U.S. Provisional Patent Application No. 62/756,433 entitled "AIRSPACE DESIGN SYSTEMS AND METHODS FOR THE SAME" and filed on Nov. 6, 2018. The entire content of the before-mentioned patent application is incorporated by reference as part of the disclosure of this patent document.

TECHNICAL FIELD

This patent document is directed generally to airspace and airport systems, and more particularly, to systems and methods for airspace information modelling and design.

BACKGROUND

Terminal airspace is the volume of airspace around the airport where all arrivals and departures take place. En-route airspace is the volume of airspace between airports that aircraft cruise through, subsequent to the climb and prior to the descent. Existing terminal and en-route airspace operations are static and non-responsive to the dynamic changes in air traffic demand, and result in aircraft having to fly longer distances, consume excess fuel, and produce excess noise and emissions. Airspace modeling techniques, which can account for the interdependencies between the various systems involved in airspace operations, are being developed in order to more efficiently plan, design and manage airspace to accommodate ever-increasing air traffic demand.

SUMMARY

Disclosed are devices, methods and systems for efficient airspace design and planning based on the Airspace Information Model (AIM), which provides a holistic solution that accounts for the modelling of all the interdependencies between the several operational systems involved in airspace design and planning and integrates the design, performance evaluation and fast-time simulation functions typically employed by other platforms for airspace and airport(s) system design and planning into one single system. AIM equips aviation professionals with the tools to more efficiently plan, design and manage the airspace and airport systems by integrating the processes of design, performance and safety evaluation and optimization.

In one aspect, the disclosed technology may be used to provide a method for designing an improved airspace model that includes receiving, via an interactive user interface, a first user input that comprises at least one of one or more waypoints, a flight plan, weather information, an airport model or procedure, airport obstacle data, or census population data; generating, based on the first user input, an airspace design; performing a validation of the airspace design against a first aviation standard, the validation comprising a set of design rules and criteria for evaluation of aircraft performance and safety of operations; generating, based on at least the parametric model, at least one key performance indicator (KPI) for the airspace design; providing for display, on the interactive user interface, a value of the at least one KPI; receiving a second user input that comprises an updated value for at least one of the one or more waypoints, the flight plan, the weather information, the airport model or procedure or the airport obstacle data; and providing for display, based on the second input, an updated value of the at least one KPI.

In another aspect, the disclosed technology may be used to provide a method for designing an improved airspace model that includes providing for display, on the interactive user interface, a two-dimensional view of an airspace or an airport system, the two-dimensional view comprising at least a first waypoint of a flight path for an aircraft, a second waypoint of the flight path for the aircraft, and one or more parameters for at least a first flight segment between the first waypoint and the second waypoint, the one or more parameters comprising a vertical profile including a climb gradient, a fuel burn for the aircraft, a distance traveled and a flight time for the first flight segment, or a population map or a noise level contour map for an area surrounding the first flight segment; receiving a user input, within the airspace or the airport system, comprising a third waypoint of the flight path of the aircraft; updating the one or more parameters for a second flight segment between the second waypoint and the third waypoint; and providing for display, on the interactive user interface, updated values for the one or more parameters.

In yet another aspect, the disclosed technology may be used to provide a method for designing an improved airspace model that includes providing for display, on the interactive user interface, a two-dimensional view of an airspace or an airport system, the two-dimensional view comprising at least a first waypoint of a flight path for an aircraft, a second waypoint of the flight path for the aircraft, and one or more parameters for at least a first flight segment between the first waypoint and the second waypoint, the one or more parameters comprising a vertical profile including a climb gradient, a fuel burn for the aircraft, a distance traveled and a flight time for the first flight segment, or a population map or a noise level contour map for an area surrounding the first flight segment; receiving a user input, within the airspace or the airport system, comprising a first new position for the first waypoint or a second new position for the second waypoint; updating the one or more parameters for the first flight segment between first waypoint and the second new position or the first new position and the second waypoint; and providing for display, on the interactive user interface, updated values for the one or more parameters.

In yet another aspect, the disclosed technology may be used to provide a method for designing an improved airspace model that includes providing for display, on the interactive user interface, a two-dimensional view of an airspace or an airport system, the two-dimensional view comprising at least a first waypoint of a flight path for a first aircraft, a second waypoint of the flight path for the first aircraft, and one or more parameters for at least a first flight segment between the first waypoint and the second waypoint and a buffer zone surrounding the first flight segment, the one or more parameters comprising a vertical climb gradient, obstacle data or a key performance indicator (KPI); receiving a user input, within the airspace or the airport system, comprising a second flight segment within the airspace or the airport system; updating the one or more parameters for the first flight segment due to its interaction with the second flight segment; and providing for display, on the interactive user interface, updated values for the one or more parameters.

In yet another aspect, the disclosed technology may be used to provide a method for designing an improved airspace model that includes providing for display, on the interactive user interface, a two-dimensional view of a first airport, the two-dimensional view comprising a first plurality of flight paths originating or terminating at the first airport and one or more parameters for the first airport; receiving a user input comprising a second airport, the second airport being in an airport system that includes the first airport; and updating the one or more parameters based on an inclusion of the second airport and interactions between the first plurality of flight paths and a second plurality of flight paths originating or terminating at the second airport, wherein the one or more parameters comprise at least one of an indication of operational safety for each of the first plurality of flight paths, operational characteristics for each of the first plurality of flight paths including a fuel burn, a runway configuration, a distance or a flight time, one or more environmental factors associated with the first airport including a noise level contour map for the first airport or emissions associated with aircrafts on each of the first plurality of flight paths, or operational characteristics of the first airport including capacity and throughput.

In yet another aspect, an apparatus comprising a memory and a processor implements the above-described methods is disclosed.

In yet another aspect, the method may be embodied as processor-executable code and may be stored on a non-transitory computer-readable program medium.

The above and other aspects and features of the disclosed technology are described in greater detail in the drawings, the description and the claims.

BRIEF DESCRIPTION OF THE DRAWINGS

FIG. 5 is a table illustrating an example of validation and documentation of dynamic design rules for United States Standard for Terminal Instrument Procedures (US TERPS).

DETAILED DESCRIPTION

Figure 1A:
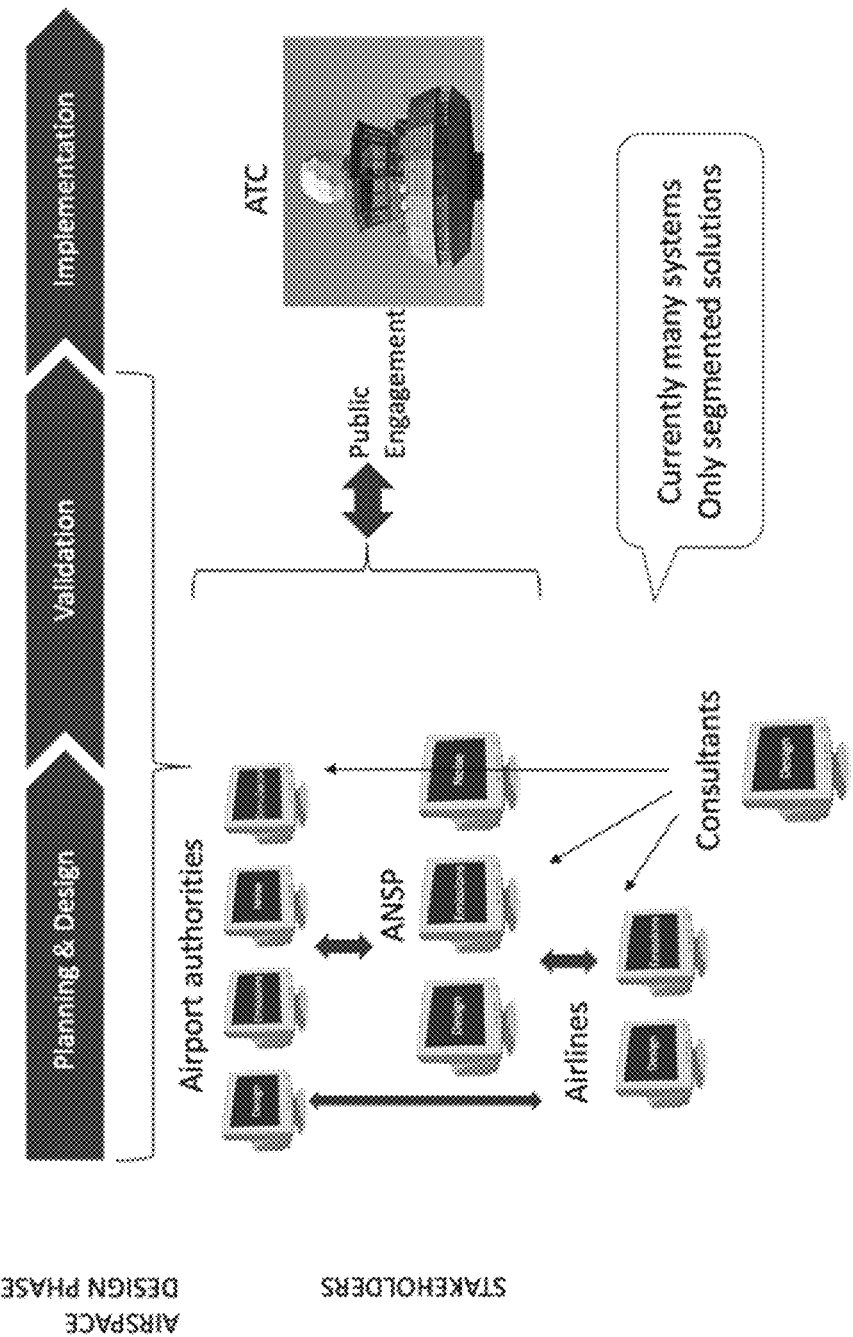
FIG. 1A illustrates an example of an existing implementation of airspace design, stakeholders and processes.

In civil engineering, Building Information Modeling (BIM) is a widely adopted process for engineering and architectural design. The BIM concept enables the evaluation of performance and cost of a building or structure at the design stage, thereby enabling designers and other stakeholders to increase their awareness with regard to the process and expected outcomes of a building or structure project. BIM is supported by a range of design software, e.g. Autodesk Revit.

In the aviation industry, the airspace design and planning process shares some similarities with civil engineering with regards to requirements, needs and design criteria. To-date, the stakeholders involved typically use a plethora of in-house and off-the-shelf modeling tools, that focus on a singular aspect of the operations while lacking the ability to capture interdependencies across the system. For example, procedure design and evaluation are treated independently of the performance evaluation of the application of traffic on the procedures being designed.

Current tools and methods do not allow for the evaluation of procedures with respect to their surrounding procedures, airspace sectors, obstacles, etc. Furthermore, the environmental performance and cost performance of procedures are only possible post-design and with a different set of tools for each of the aforementioned functions. The need to use a plethora of non-communicating and isolated tools and processes to perform the airspace design and planning process results in inefficiencies when evaluating the design requirements and design trade-offs between competing objectives. Thus, efficiency improvements are small and incremental at best, and are typically delayed or partially implemented in practice due to objections that may be raised by several stakeholders, such as the planning authorities (e.g., airports, air navigation service providers), airspace users (e.g., airlines) or local communities.

The limitation of current tools to produce solutions that account for the full spectrum of operational interdependencies results in inefficient use of available resources and significantly long airspace and airport improvement planning cycles, which may in turn significantly delay or dampen the impact of the implementation of such improvements in practice. Typically, existing software alternatives only offer solutions that support, solely and in isolation to one another, the design and performance evaluation modules. The integration of these functions is only limited, if any, which results in solutions that are suboptimal.

Embodiments of the disclosed technology are directed to Airspace Information Modeling (AIM), a design method and associated system for efficient airspace design and planning, which enables parametric design and planning that can evaluate design criteria and requirements, while also evaluating performance and trade-offs of different metrics at design-time.

In some embodiments, AIM provides a five dimensional (5D) process and system that enables the three-dimensional procedure design and evaluation (geometric characteristics of procedures) along with the evaluation of operational procedure and airspace system performance given the assignment of air traffic demand (time) to procedures and estimation of key performance indicators, such as fuel burn, flight time, distance travelled, emissions, noise and monetary cost of operations (cost).

Amongst other features and benefits, the methods and system of the disclosed AIM enable:

1. Assessment of an existing design.
2. Dynamic assessment of proposed design changes in real-design-time.
3. Holistic evaluation of airspace procedures with instant user feedback.
4. Increased awareness to designers, operators and regulators.
5. Assessment of proposed design scenarios and capability for comparison.
6. Live monitoring of operations with real-time performance estimation.

In some embodiments, the AIM system equips aviation professionals with the tools to more efficiently plan, design and manage the airspace and airport systems by integrating the processes of design and performance evaluation in a single system. The AIM system or the process of airspace information modeling advantageously enables the representation, management, design and planning of an airspace and airport(s) system.

In some embodiments, AIM encompasses a complete parametric model of an airspace and airports system that includes elements related to the operation of the system and that seamlessly integrates a design module, a performance evaluation module and a core parametric model. The core parametric model, in conjunction with the design and performance evaluation modules, enables the holistic evaluation of airspace design criteria, performance of air traffic demand and evaluation of trade-offs of several Key Performance Indicators (KPIs) with real-time feedback at design time. In an example, at design time means that the user is provided with feedback on proposed design changes with regards to design criteria evaluation and performance evaluation via a user interface or visualization function of the AIM. This advantageously enables the user to achieve increased awareness of the direct and indirect consequences of design changes, while allowing for the evaluation of all interdependencies and performance trade-offs between the elements of the AIM.

Figure 1B:
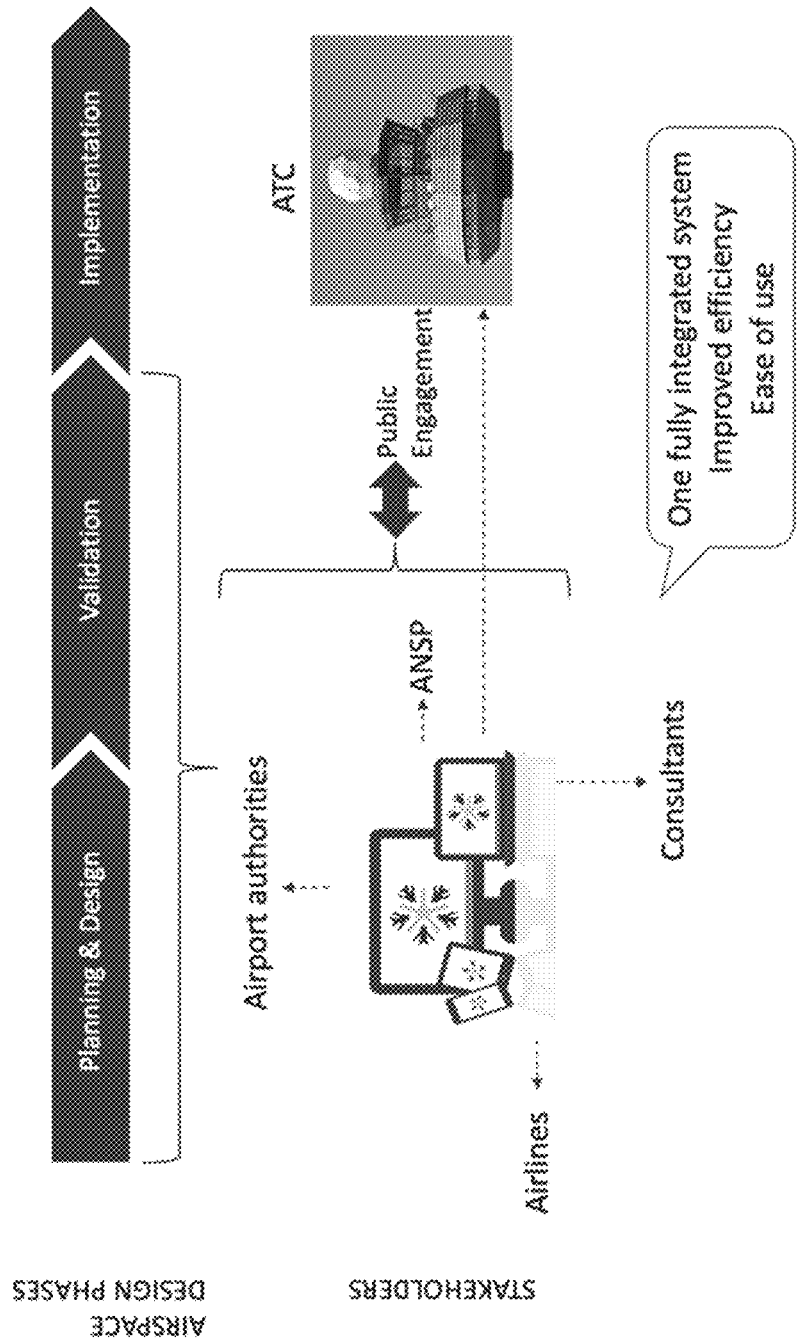
FIG. 1B illustrates an example implementation of airspace design, stakeholders and processes, in accordance with embodiments of the disclosed technology.

Embodiments of the disclosed technology integrate design, evaluation and optimization into a single system. The AIM systems and methods provide a common frame of reference for the stakeholders involved in the design process, as well as supports advanced visualization capabilities that can be used for the effective communication of proposed improvement plans to the public, offering visual "as-is" to "proposed" scenario comparisons with complete environmental impact evaluation and noise exposure assessment in particular. The AIM systems and methods can obtain globally optimal solutions, thereby ensuring: (1) maximization of system capacity, (2) much improved system efficiency, (3) seamless collaboration and communication between the involved stakeholders and the public, and (4) its successful communication to and implementation by air traffic control (ATC). FIG. 1A illustrates the airspace design and planning process "as-is" today, identifying the airspace design phases, stakeholders involved (including airport authorities, an air navigation service provider (ANSP), airlines, and consultants), and complexity invoked by the plethora of disjointed existing tools. FIG. 1B illustrates how this process can significantly improve using the AIM design methodology and systems which benefits all stakeholders, in accordance with the embodiments described herein.

Section headings are used in the present document to improve readability of the description and do not in any way limit the discussion or the embodiments (and/or implementations) to the respective sections only.

Components of the Airspace Information Model (AIM)

Figure 2:
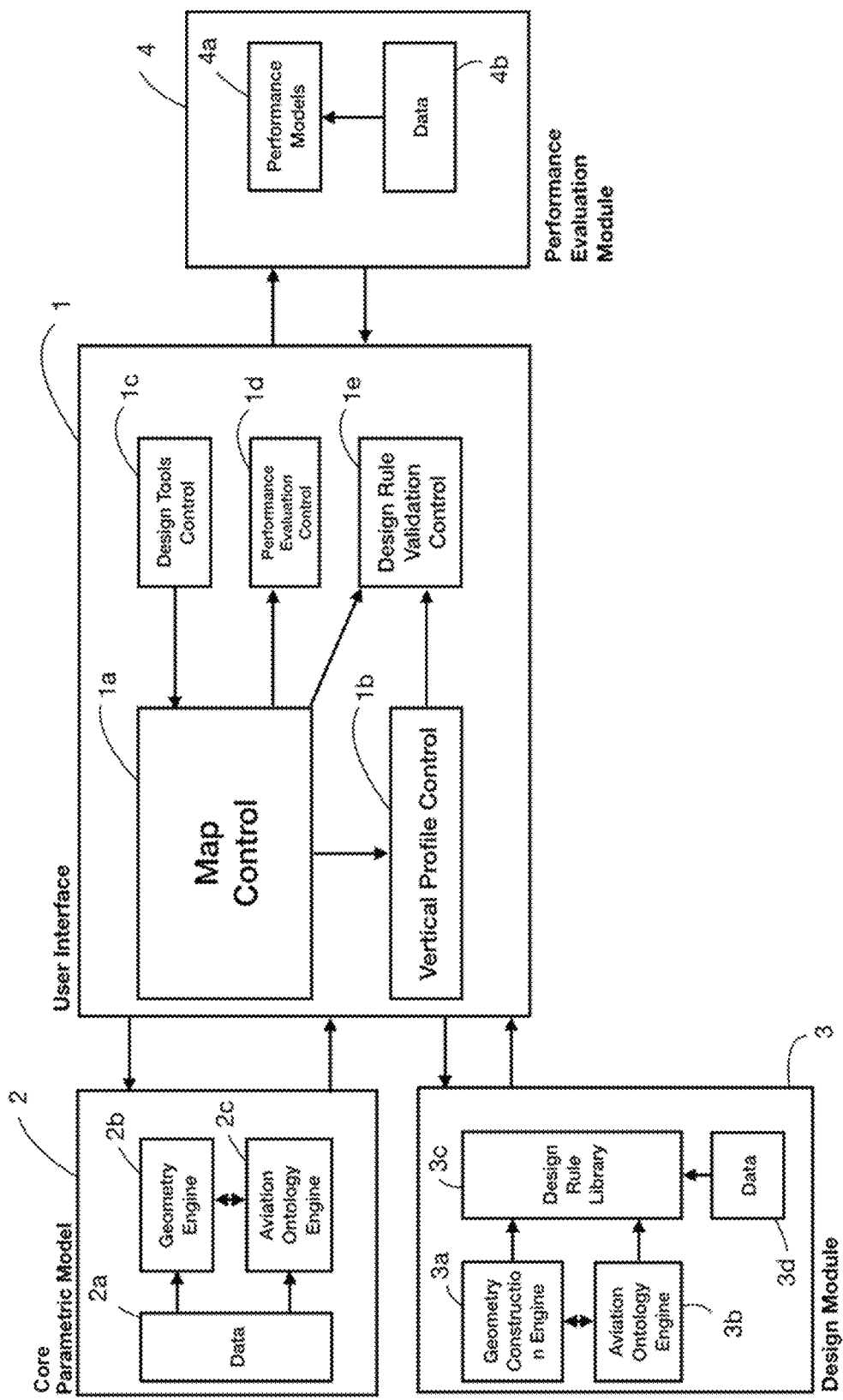
FIG. 2 is a block diagram illustrating an example of the Airspace Information Model (AIM) core architecture.

FIG. 2 illustrates some of the components and interactions of the AIM architecture. As illustrated therein, the AIM components include:

1. User interface (block 1 in FIG. 2)
2. Core parametric model (block 2 in FIG. 2)
3. Design module (block 3 in FIG. 2)
4. Performance evaluation module (block 4 in FIG. 2)

Figure 3:
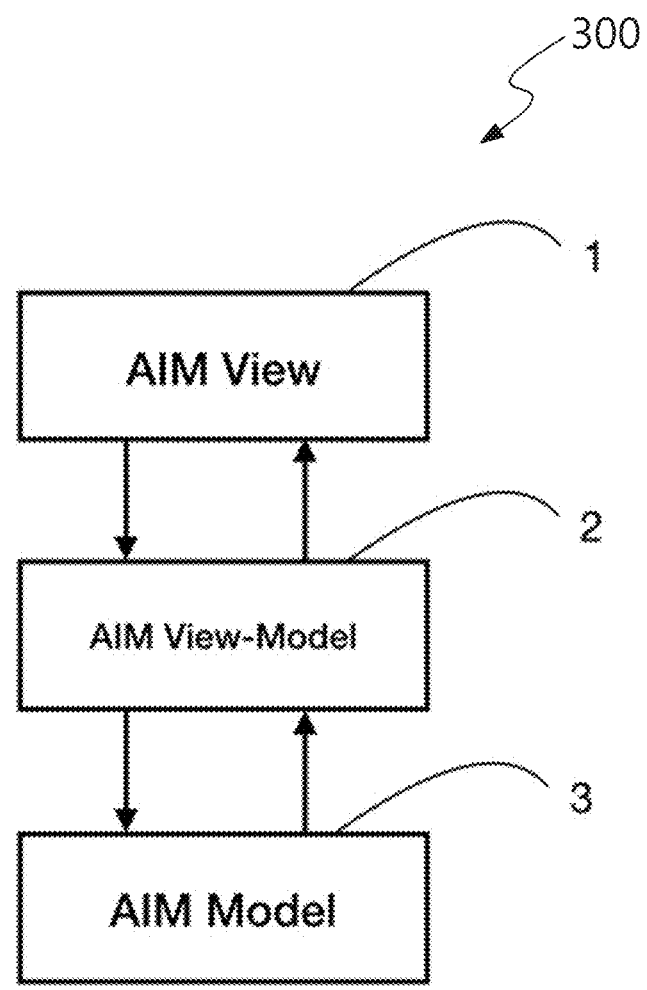
FIG. 3 is a block diagram illustrating the model-view-viewmodel (MVVM) architecture of the AIM engine.

In some embodiments, the AIM model is supported by an AIM engine. The AIM engine utilizes a Model-View-ViewModel (MVVM) architecture, as illustrated in FIG. 3, to enable the storing, distribution and display of data to the user. The MVVM architecture is a software architectural pattern that facilitates a separation of development of the graphical user interface from development of the business logic or back-end logic (the data model). The view model of MVVM is a value converter, which is responsible for exposing (converting) the data objects from the model in such a way that objects are easily managed and presented.

As illustrated in FIG. 3, the AIM engine consists of:

1. AIM view
2. AIM view-model implementations
3. AIM model

In some embodiments, all functions of the user interface are supported by the AIM view. The core parametric model, design module and performance evaluation module are supported by the AIM model, and their interactions are mediated by the AIM view-model implementations, which act as use-case orchestrators between the user interface and the general capabilities of the AIM model.

Example Operation of AIM

In some embodiments, a user may perform different actions via a set of controls available via the user interface. For an example, such controls may include map control, vertical profile control, design tools control, performance evaluation control, design rules validation control, and other types of controls. Each control displays, at any given moment, the most up-to-date status and information regarding specific components of interest to the user via a relevant AIM view-model implementation. The user may use one or more of the controls to perform an action with regards to specific components of the system. Each user action is suitably translated through the relevant AIM view-model implementation to a number of requests, which are then forwarded to the relevant module or combination of modules (e.g., the core parametric model, the design module and the performance evaluation module) of the AIM model, in order to produce the relevant results, the outputs of which are interpreted and displayed in the user interface.

In some embodiments, each state of the system, e.g. a current snapshot of a procedure being designed by the user, is stored within the boundaries of each AIM view-model implementation in the relevant structural forms defined in the AIM model. The AIM view-model implementations are responsible for storing the states of each component of the system and distributing the relevant data between the AIM view and the AIM model. All calculations performed by the individual modules (e.g., design module or performance evaluation module) and the storing of information and distribution of data by the AIM view-model as well as geometric calculations and updates take time on the order of fractions of a second to perform, and any change in the status of the system can be graphically depicted instantly to the user, while parameters are also immediately updated. This means that when the user moves the mouse, and at any location of the mouse, the controls display up-to-date information, thus enabling real-time evaluation of the side-effects any action of the user has on the system state.

In some embodiments, the AIM model architecture is generic and additional modules to the ones described above may also be implemented and integrated in the AIM model architecture and deployed by the AIM MVVM engine.

AIM Model Architecture Description

As illustrated in FIG. 2, the AIM model includes the user interface, the core parametric model, the design module and the performance evaluation module.

User Interface (UI)

In some embodiments, the UI provides easy-to-use functionality in conjunction with a multiple-view visualization interface to offer simultaneous real-time inspection of data and interventions from different perspectives. In an example, this is achieved by providing different sets of controls that correspond to the different use cases supported by the components of the AIM model architecture. The UI enables multiple-view visualization and the capability for simultaneous inspection and intervention to multiple elements via a unified multiple-view layout management, thereby offering action-specific, context-sensitive interaction.

In some embodiments, these controls enable the parameterization, estimation and evaluation of several aspects of aviation-related analysis and include:

Map control (block 1*a* in FIG. 2)
Vertical profile control (block 1*b* in FIG. 2)
Design tools control (block 1*c* in FIG. 2)
Performance evaluation control (block 1*d* in FIG. 2)
Design rules validation control (block 1*e* in FIG. 2)

Map Control

In some embodiments, the map control is used to display two-dimensional information, including but not limited to:

FAA LEGACY data files that are parsed by the AIM as geospatial information with respective attribute tables:
Airports and other landing facilities (APT)
Fix/Reporting point/Waypoint (FIX)
Navigation Aids (NAV)
Preferred Route (PFR)/Tower Enroute Control (TEC) Routes
Regulatory Airways (AWY)
Coded Departure Route (CDR), which are preplanned, alternative routes between a specified city pair that can be quickly activated when traffic constraints exist, such as thunderstorms, turbulence or periods of excessive demand.
Air Traffic Survey (ATS) Non-Regulatory Airways
ARTCC Boundary Descriptions (ARB), wherein ARTCC is the Air Route Traffic Control Center that is a facility responsible for controlling aircraft flying in a particular volume of airspace at high altitudes between airport approaches and departures.
Holding Patterns (HPF)
ARTCC Facilities (AFF)
Automated Surface Observing System (ASOS), which is configured to report barometric pressure, wind speed and direction, DA, visibility, sky condition, ceiling height, and precipitation/Automated Weather Observing System (AWOS) that supports similar functionalities and are typically operated by the FAA or other local agencies.
Air Traffic Control (ATC) Tower and Satellite Airport Communications (TWR)
Country Codes
Enroute National Fix Program Significant Points (NATFIX)
Flight Service Station Communications Facilities (COM)
Flight Service Stations (FSS)
High Altitude Redesign (HAR) Significant Points (HARFIX)
Instrument Landing Systems (ILS/MLS) (ILS)
Location Identifiers (LID)
Miscellaneous Activity Area (MAA)
Military Training Routes (MTR)
Parachute Jump Area (PJA)
Standard Terminal Arrival/Standard Instrument Departure (Complete Set) (STARDP)
Standard Terminal Arrival/Standard Instrument Departures (AFSS Subset) (SSD)
State Codes
Weather Reporting Locations (WXL)
Special Use Airspaces (SUA)
FAA Digital Obstacle Files (DOF) (Obstacles data)
FAA's aeronautical data in ESRI Shapefile (.shp) format
ARINC 424 data
Census Population data
Terminal Procedure chart plates from the FAA's database
Complete airport modeling data including aerodrome geographic information, runway network (locations, dimensions, orientation), taxiway network, aprons, gates, park stands, and de-icing locations or facilities In some embodiments, the user may access additional information on the above by selecting specific elements. This information is retrieved from the relevant module, e.g., the core parametric model, the design module, or the performance evaluation module, and is in turn displayed within the map control in a separate property window.

In some embodiments, the user may also perform several actions and request specific tasks, such as design new elements, e.g., procedures via the map control.

Vertical Profile Control

In some embodiments, the vertical profile control allows for the inspection and intervention of selected elements from the map control, in mileage and vertical dimensions. The vertical profile control further enables the analysis of cross-sections along the mileage of a longitudinal element, e.g. a procedure. When a specific element is selected in the map control, its mileage and elevation are displayed in the vertical profile control, along with perpendicular projections of all neighboring objects to the centerline of the element. These projections can be calculated at a "buffer zone" on each side of the centerline, which can be varied by the user (and are further described in the context of FIGS. 4A and 4B).

In some embodiments, additional information with regards to other functions, such as performance evaluation results may also be displayed in the vertical profile control as spatial elements. All pertinent calculations are performed in the relevant modules, e.g. the core parametric model, the design module, the performance evaluation module and their results are displayed in the vertical profile control. The user may also use the vertical profile control to affect specific elements, e.g. adjust procedure design gradients, etc.

Design Tools Control

In some embodiments, the design tools control includes controls related to tasks performed by the design module. These may include tasks related to airport design (runway, taxiway, gate planning, etc.), airspace design (procedure design, design rules and criteria selection, airspace sectorization, etc.) and generic geometric design. Each design tool control requests input from the user and provides guidance for completing each design task.

Performance Evaluation Controls

In some embodiments, the performance evaluation controls allows the user to inspect current performance of design elements or conduct more complex performance evaluation analysis related to specific design elements or to a set of design elements (e.g., an entire airspace and airport model). These controls may display performance evaluation results in terms of fuel burn, distance travelled, flight time, delays, among others and these can be calculated for different parameters, e.g., types of aircraft, wind conditions, etc. All calculations related to the performance evaluation controls tasks are performed in the performance evaluation module.

Design Rules Validation Control

In some embodiments, the design rules validation control displays the results of the design module related to conformance of design to specific sets of design rules and criteria implemented in the design rule library in the design module. All design rule and criteria evaluations are performed by the design module. The design rules validation control displays the results of the design rule and criteria evaluations at each current state of the system, whether they pass or fail, possible recommendations, along with citations to the relevant documentation (e.g., design manual paragraph and number). The user may inspect the status of design rule and criteria evaluations in the design rules validation control and may also activate or deactivate specific rules or criteria. In an example, this may be useful for procedure design that is "outside criteria."

In some embodiments, the combination of one or more of the controls in the UI enables the user to attain a holistic understanding of the status of an airspace and airport system, identify potential interdependencies between components, create design alternatives and evaluate their performance.

Core Parametric Model

In some embodiments, the core parametric model encompasses an extensive data structure and inter-relationship model for entities relevant to operations carried out within the aviation-domain ontology including modeling of the complete information that characterize an airspace and airport system. It serves as a unified representational model for data storage, intra- and inter-module ex-change. In an example, it includes development of geometry libraries, organization of data in query-able databases, application functionality and interaction in classes, class responsibilities and internal layouts, interface design and integration with the design module and the performance evaluation module and the UI. All calculations of the core parametric model take place at the model layer of the AIM MVVM architecture.

As illustrated in FIG. 2, the core parametric model consists of:

(1) Data input (block 2a in FIG. 2)
(2) Geometry engine (block 2b in FIG. 2)
(3) Aviation ontology engine (block 2c in FIG. 2)

In an example of the workflow of the core parametric model, data input is supported by the UI. Once data is imported to the core parametric model, the geometry engine identifies the geometric properties of each datum, while the aviation ontology engine creates the relevant class instances and assigns to each datum aviation-specific properties.

In one example, when a standard instrument departure (SID) route is imported, the geometry engine identifies the geometric coordinates of each SID waypoint, while the aviation ontology engine identifies and creates the relevant properties for aviation specific properties, such as SID leg types (e.g., Direct to Fix (DF), Vector to Altitude (VA), etc.). In another example, when an obstacle datum is imported, the geometry engine identifies its geometric properties, such as coordinates and altitude, while the aviation ontology engine identifies aviation related properties and creates the corresponding aviation ontology class instances, e.g., the obstacle accuracy codes used for obstacle clearance and evaluation analysis.

When a given object in the core parametric model is modified, e.g., a new procedure is created, or the geometry of an existing procedure is altered, all objects and instances of the core parametric model that are related to the object being modified are automatically updated. This enables updated information on all objects as well as the instant calculation of all object interactions and interdependencies.

The core parametric model supports a variety of objects and data structures that describe the airspace and airport system. Examples of such objects and data structures are enumerated in the map control section described previously.

Design Module

In some embodiments, the design module within the AIM systems enables the dynamic evaluation of user-imported design rules and criteria for airspace procedure design enabling real-time feedback at design time for the creation of design variants that may relate to a set or the entirety of the elements supported by the core parametric model.

In some embodiments, the design module includes:
Geometry construction engine (block 3a in FIG. 2)
Aviation ontology engine (block 3b in FIG. 2)
Design rule library (block 3c in FIG. 2)
Data input module (block 3d in FIG. 2)

In some embodiments, the design module handles the various user-specified design requests generated in the UI. The geometry construction engine handles the geometric construction parts of such requests (e.g., procedure design) and enables the creation of geodetic coordinates and other geometric characteristics related to design objects. The aviation ontology engine works in conjunction with the geometry construction engine and converts geometry to aviation ontology, i.e., assigns aviation specific properties to the design objects being created.

In one example, when a SID route is being designed, the aviation ontology engine will assign an altitude restriction of the type "at", "above" or "below" at each SID waypoint, as these are specified by the user via the UI. In another example, when a SID route is being designed, the aviation ontology engine will assign a speed restriction of the type "at", "above" or "below" at each SID waypoint, as these are specified by the user via the UI. In yet another example, when an instrument approach procedure is being designed, the aviation ontology engine will assign the flight phases at each leg from the options of "final", "intermediate", "initial", or "feeder", as specified by the user via the UI. Each leg type corresponds to specific set of design rules and criteria.

The design rule library supports the import of design rules and criteria, typically used to evaluate aircraft performance and safety of operations, and the subsequent evaluation of individual design rules and criteria during the design.

In an example, a library in the design module is organized at levels, e.g.:
Design rule library
    Design rules set
        Design rules category
            Individual design rules In the exemplary hierarchy described above, the design rules set is the collection of a set of individual design rules that abide to common design standards, typically supported by relevant documentation. The most common such design standards include:
- the United States Standard for Terminal Instrument Procedures (TERPS), which specify the minimum measure of obstacle clearance that is considered by the Federal Aviation Administration (FAA) to supply a satisfactory level of vertical protection from obstructions and are predicated on normal aircraft operations.
- the United States Standard for Performance Based Navigation (PBN) Instrument Procedure Design, which are based on Area Navigation (RNAV) or Required Navigation Performance (RNP) and include an Instrument Landing System (ILS) or Ground Based Augmentation (GBAS) Landing System (GLS) final segment
- the ICAO Document 8168 for Procedures of Air Navigation Services and Aircraft Operations (PANS-OPS), which are rules for designing instrument approach and departure procedures, and that are used to allow aircraft to land and take off when instrument meteorological conditions (IMC) impose instrument flight rules (IFR).

In some embodiments, the design standard can include updates to any of the above common design standards, or any other custom aviation standard.

Within a design rules set, individual design rules are organized into design rules categories. Each design rule category is a collection of individual design rules that correspond to the design of a specific type of procedure. For example, a standard instrument departure (SID) procedure can be designed to RNAV 1 minima, in which case SID Procedure to RNAV 1 minima is a distinct design rule category. When the user initiates the creation of a SID Procedure RNAV 1, only the individual design rules within this category are examined.

In some embodiments, the individual design rules are organized into objects and each object is verified at any given instance based on current design parameters input by the user in the UI map control. The result of this verification is displayed to the user via the design rules validation control and possible outcomes are: (1) valid, meaning that the current design meets specific individual design rule or criterion; (2) invalid, meaning that the current design does not meet specific individual design rule or criterion; (3) not applicable, meaning the specific individual design rule or criterion is not applicable for the current design. In cases (1) and (2), the design rules validation control also provides the user with the specific validation result.

For example, an with regard to safety of operations, the design module ensures that all design rules and criteria are met and within limits and constraints, and that aircraft performance is within flyability bounds of the simulation model being used. In an example, separation minima between neighboring procedures, external obstacles and constraints must be met when designing a new procedure or modifying an existing procedure. In another example, obstacles clearance is adequately provided by the design according to the design rules and criteria.

For example, when designing a departure procedure, if the current design climb gradient is 180 ft/NM (feet per nautical mile) and the individual design rule or criterion suggests that the minimum climb gradient is 200 ft/NM, then the relevant feedback message will be displayed to the user via the design rules validation control informing them of what actions should be taken to abide to the relevant design rule and criteria. The user also has the capability to enable or disable individual design rules or criteria. This enables the user to design outside criteria, which could be the desired solution for example for the design of an RNAV visual approach procedure.

In some embodiments, obstacle clearance areas (OCA) and initial climb areas (ICA) are also calculated by the geometry construction engine and the aviation ontology engine using design criteria as found in the design rule library and are subsequently evaluated against these. OCA and ICA are also displayed in both map control and vertical profiles control, while the evaluation results are displayed in the rule validation control of the UI.

In some embodiments, the transfer of information between the modules is facilitated by relevant providers. For example, the design rule library requests individual pieces of information relevant to the design, which are supplied by providers. Providers send information to the design rule library, which performs several types of checks, including:
- Geometry checks. For example, during the design of a new SID procedure, the angle between consecutive SID legs is checked against the maximum upper limit for the given design rule set and category.
- Integrity checks. For example, during the design of an Instrument Approach Procedure, the sequence of leg flight phases is checked to meet the logical order of "feeder"—"initial"—"intermediate"—"final" and that there are no flight phases missing in-between, e.g., the order "initial" followed by "final" would not pass the integrity check.
- Operational checks. For example, when designing a SID procedure with climb gradient above 500 ft/NM require approval by flight standards and is communicated to the user via the UI and the design rules criteria control.
- Custom user-defined checks. In one example, when designing a new procedure, the user may activate or deactivate specific design rules and criteria, e.g., maximum turn angle, which they wish to override for a given design instance.

In an example, such providers include but are not limited to:
- Route data provider, which sends geometry and aviation information from map control to all other controls (charts)
- Airspace system provider, which sends static system component information (e.g., obstacles, routes, etc.) to all controls
- Obstacle clearance provider, which takes obstacle info from the airspace system provider and route data provider to construct OCA and evaluate clearance slope from the design rule library and the criteria library In some embodiments, the design module also supports the evaluation of design elements with their neighboring components, e.g., other design elements or other static elements supported by the core parametric model. Such conflict evaluation includes but is not limited to the following:

Route projections or conflicts to centerline
Obstacle projection to centerline
Sector overlap projections
Altitude ranges above and/or below
Clearance slope
Controlling obstacles to see at which mileage obstacles are located Examples of design tasks supported by the design module include:

Instrument Approach Procedures. These can be further categorized into precision approach (PA), approach with vertical guidance (APV) and non-precision approach (NPA) procedures. Some of the important design and evaluation criteria for this instrument flight procedure (IFP) type include:

Obstacle clearance: For the calculation of the required obstacle clearance (ROC), two different features of the obstacle clearance surface are utilized. The first feature is the level OCS, applicable to initial, intermediate and NPA final approach segments, where a horizontal band of airspace is calculated and is added to the highest obstacle within each segment. The second feature is the sloping OCS, applicable when descending on a glidepath or executing a missed approach procedure. In the latter case, a minimum climb gradient of 200 ft/NM is considered the norm for providing adequate required obstacle clearance, unless the design module estimates, based on the available obstacle data, that a higher climb gradient is necessary.

Aircraft performance: The design module utilizes speed and approach categorization for different sets of design rules (e.g. ICAO approach speed categorization and FAA approach categories), to classify aircraft into performance categories (e.g. five categories A to E, based on FAA's speed profile classification).

Landing minimums: In order to execute decisions based on established minimum heights, such as whether the initiation of a missed approach should take place, a variety of parameters are taken into consideration, e.g., decision altitude (DA), height above touchdown (HAT), minimum descent altitude (MDA), for which custom rules can also be enforced.

Standard Terminal Arrival (STAR) Procedures. As highlighted in TERPS, these are "pre-planned routes, designed to facilitate the transition from the en-route environment to the terminal environment for landing at one or more airports." Some of the important design and evaluation criteria for this IFP type include:

Obstacle clearance: The notion of "level flight" segments is utilized, where a typical required obstacle clearance value of 1,000 ft (or 2,000 ft over designated mountainous areas) is used for STAR in order to calculate both the minimum obstacle clearance area and the minimum en-route altitude for each segment of the route that it is to be designed/evaluated.

Structural and geometric criteria: To meet the official requirements for the way that the route is constructed and/or aligned with other types of routes, these are automatically detected by the design module, which provides in turn guidance or warnings when there is a rule violation. For example, the intersecting angle of a STAR's initial routing with the air traffic service (ATS) routes where it begins must not exceed 120 degrees. Similar rules are checked for what concerns the terminal fix of a STAR, where the intersecting angle of the corresponding approach procedure with the STAR's final segment must not exceed 90 degrees.

Descent gradient: The design module includes all the necessary algorithms for establishing a descent gradient profile which matches the official standards set by design rules within the design rule library (e.g. no descent gradient above 330 ft/NM is allowed for an aircraft above 10,000 ft above mean sea level (MSL), or more than 318 ft/NM when it descends starting from below 10,000 ft MSL).

Departure Procedures. The main purpose of a departure procedure is to assist pilots in avoiding obstacles until they reach the minimum en-route altitude, i.e., during the initial climb phase after take-off from the departure runway. Some of the important design and evaluation criteria for this IFP type include:

obstacle clearance: The calculation of the optimal climb gradient for an aircraft during its departure phase is of critical importance, mainly due to the proximity with other aircraft and the obstacles in the area. Every detail concerning the factors that can have a major impact on the obstacle clearance evaluation is taken into consideration, using standard departure obstacle clearance surface criteria from the design rule library, e.g., a minimum 200 ft/NM climb gradient, which is recalculated based on the obstacle distribution in the area of interest and the controlling obstacle. Individual characteristics of each runway, such as departure end of the runway or take-off distance available (TODA) and take-off run available (TORA) are also taken into consideration, along with the official published take-off minimums for each airport runway coded as imported data in the core parametric model.

Take-off minimums: A database with official take-off minimums for each airport runway, which is regularly updated, can be imported and stored in the core parametric model. It includes the minimum mandatory climb gradient during the departure phase, along with its termination altitude and visibility requirements. The user, performing an obstacle analysis by examining obstacle data (e.g. Digital Obstacle Files published by FAA), can evaluate and produce their own take-off minimums and mandatory climb gradients, either for obstacle clearance or for ATC's convenience (ATC minimum climb gradient for traffic issues, depending on runways' configuration).

Structural criteria: Each leg of a departure route is evaluated based on Performance Based Navigation (PBN) criteria and according to its special type, the most important of which are heading to intercept (VI), heading to altitude (VA), course to fix (CF), track to fix (TF), direct to fix (DF) and radius to fix (RF), which allows the design of curved segments, in contrast to conventional straight legs.

En-route Procedures. En-route procedures are pre-planned routes utilized during the en-route phase of flight. The design module enables further categorization of en-route routes based on the official categorization given a set of design rules, such as J (Jet), V (VOR), Q and T (GPS RNAV) routes.

Performance Evaluation Module

In some embodiments, the performance evaluation module enables the real-design-time evaluation of a set of Key Performance Indicators (KPIs) in direct association with the design module tools. The performance evaluation results are instantly displayed to the various UI controls, enabling the user to monitor and evaluate the effects of design changes in terms of trade-offs between multiple KPIs.

As illustrated in FIG. 2, the performance evaluation module includes:

(1) Performance models (block 4a in FIG. 2)
(2) Data module (block 4b in FIG. 2)

Performance models are individual models for the calculation of several KPIs, which include models for aircraft performance (fuel burn, distance travelled, flight time, delay, engine-out or all-engine performance, etc.), environmental performance (noise, emissions, etc.), and airspace and airport system performance (sector capacity, airport runway capacity, airport taxiway capacity, airport gate capacity, etc.). Each performance model is supported by a relevant data module, e.g. Base of Aircraft Data (BADA), Aircraft Noise and Performance (ANP) database, etc., which encompasses data from specific data sources, e.g. BADA.

In some embodiments, different performance models may be implemented within the AIM framework to enable the assessment of a variety of KPIs. Some examples of performance models and data modules are described below.

Noise Estimation Model

In some embodiments, the noise estimation model used within AIM is based on the European Civil Aviation Conference (ECAC) Report on Standard Method of Computing Noise Contours around Civil Airports, Doc 29 (4th Edition) and uses the International Aircraft Noise and Performance (ANP) database. In order to estimate the noise of a single flight (and consequently a set of flights), each single flight is separated in segments and noise is calculated for each segment. The noise calculation algorithm takes into account a variety of information including aircraft type, aircraft speed types (CAS, TAS, groundspeed), engine thrust, altitude and bank angle.

In an example of noise estimation, a set of observers (points located around the flight path) is created first and the noise impact of each segment of a flight is calculated at the location each observer. Three observer settings are typically used for low (fewer observers) to high (more observers) accuracy using a geodesic grid around the flight path. The algorithm calculates noise impact at each observer, and the total impact of a flight (or multiple flights) is calculated based on accumulating individual observers' noise. After the cumulative noise levels are calculated at each observer, a Delaunay triangulation method (which provides increased accuracy compared to existing conventional methods) is implemented followed by linear interpolation to produce the noise contours resulting from each flight path. The input to the noise estimation algorithm can either be a flight for which radar data are available or a single terminal procedure (e.g., SID, individual or combination of STAR and IAP) for which a simulation algorithm is run to obtain the exact geometric routing and relevant parameters for each flight segment. All calculations are performed in geodesic coordinates, maintaining the highest possible accuracy.

Fast-Time Simulation

In some embodiments, the fast-time simulation (FTS) is used for the simulation of a single flight or a set of flights. In an example, the underlying physics models used is based on Doc 29 and BADA models. In another example, different models may be implemented.

The FTS model approximates a number of real-world physical processes (airport traffic scheduling, air traffic conflict resolution, aircraft motion, noise emissions, fuel consumption, gas emissions, runway occupancy times, etc.) involved in the operations of and interactions between entities from the aviation-domain and provides tools to perform fast-time metric calculations of relevant measures. In an example, model data may be obtained by the BADA or other data sources.

To develop an aircraft trajectory simulation algorithm for the purpose of accurately computing flight paths, the FTS model combines the BADA and Doc 29 methodologies. The Doc 29 methodology is used for simulating arrivals and departures below 10,000 ft; the BADA methodology is implemented for simulating flights above 10,000 ft.

Doc. 29 provides the necessary theoretical background for the simulation of default arrival and departure procedural steps that depend solely on an aircraft model. Flight performance calculations are computed using the aerodynamic models and thrust equations related to aircraft trajectory simulation, taking into account numerous aircraft-specific performance parameters obtained from the Aircraft Noise and Performance (ANP) database, as well as atmospheric conditions and operating procedure (flight configuration, power setting, forward/vertical speed, etc.).

BADA (Base of Aircraft Data) is a database that consists of operational performance parameters and airline procedure parameters for various aircraft types. This database is accompanied by technical reports that describe the necessary theoretical framework and methodologies required for the implementation of aircraft trajectory simulation algorithms. These include definitions of an atmospheric model and a Total-Energy Model (TEM), as well as the setup of a general theoretical background including but not limited to aerodynamics model, engine thrust model, flight envelope, fuel consumption, etc., comprising relevant equations and cases to be used in conjunction with the database's provided information for the purpose of developing a complete and accurate aircraft performance model for flight simulation.

Capacity and Delay

In some embodiments, capacity and delay estimation algorithms may be implemented for the estimation of a fix, air route, runway, runway set, airport, airspace sector capacities, etc.

An example capacity and delay algorithm can include the user creating or selecting a flight demand profile (a set of flights with origin and destination), which is in turn applied to a specific system configuration for which capacities and delays are estimated. The capacity calculation model consists of a two-step algorithm that initially provides a rough estimate to calculate a limit envelope for different airport runway configurations (1st step), which is subsequently used to obtain accurate capacity profiles using a simulation engine and Monte Carlo simulation (2nd step). In an example, the first and second steps are defined as:

First step: Flights are first classified using the aircraft wake turbulence categories (e.g. following FAA's categorization A-F). A set of flight pairs is created by examining potential sequences of aircraft on a common route. For all combinations of flight pairs, the minimum interval time is calculated. This interval time depends on flight type (arrival/departure), aircraft speed, the common path length of a pair of flights and applicable separation standards for that pair. A probability is calculated and then assigned to each flight pair. The sum of each pair interval time is then multiplied with the probability of that flight pair to obtain the weighted mean service time. The capacity of a single runway is calculated by the inverse of the weighted mean service time.

For the calculation of the capacity envelope of a single runway, runway capacity in the following four cases is estimated to obtain the corresponding four points of the capacity envelope:

(1) Service only arrival flights
(2) Service the maximum possible arrival flights and as many as possible departure flights in between
(3) Service an equal number of arrivals and departure flights
(4) Service only departure flights For capacity estimation of multiple runways, the above method is implemented and additional cases are identified to obtain the full set of possible flight pair combinations (capacity envelopes are created for each combination).

Second step: Following the approximate capacity estimation from the first step, the algorithm uses the simulation engine from the fast-time simulation model to get a more accurate estimation. The simulation engine identifies all the possible conflicts between the flights and resolves them according to the design rule library; e.g., FAA rules and separation standards (i.e., use of vectoring, holding pat-terns or delay time in gate/taxiways) and any additional data that may affect a given procedure (e.g. weather data). Capacity profiles may be calculated with (more realistic) or without (less realistic) conflict resolution by the simulation engine. In an example, the order in which the flights are serviced can be based on random priorities. In another example, the order can be based on a predetermined prioritization. Once the simulation is completed, the exact capacity for a flight demand is obtained. If the user provides an exact flight schedule, delays for the total flight set may be estimated by comparing the scheduled flight times to the simulated flight times, otherwise an optimal schedule without delays is obtained.

In some embodiments, in the case that the user does not need to estimate the capacity for a specific flight demand, a different methodology is used. The desired runway configuration is calculated first. The envelope produced by this first step will define the upper limits for possible arrival and departure flights demand. Subsequently, a Monte Carlo method is used to produce random demand within the limit envelope. For each demand profile, the second step and the simulation engine are then used to calculate the exact capacity. The resulting capacity envelope for each configuration is calculated using statistical methods using the capacities for each random demand profile.

Exemplary Embodiments of AIM

In some embodiments, the AIM systems and methods may be used for airspace and airport(s) system design and planning, real-time monitoring of operations, and airport/airspace system-wide system management. This section provides examples of some embodiments of the AIM systems and methods applied to achieve the above.

Procedure Design, Modification and Evaluation

Figure 4A:
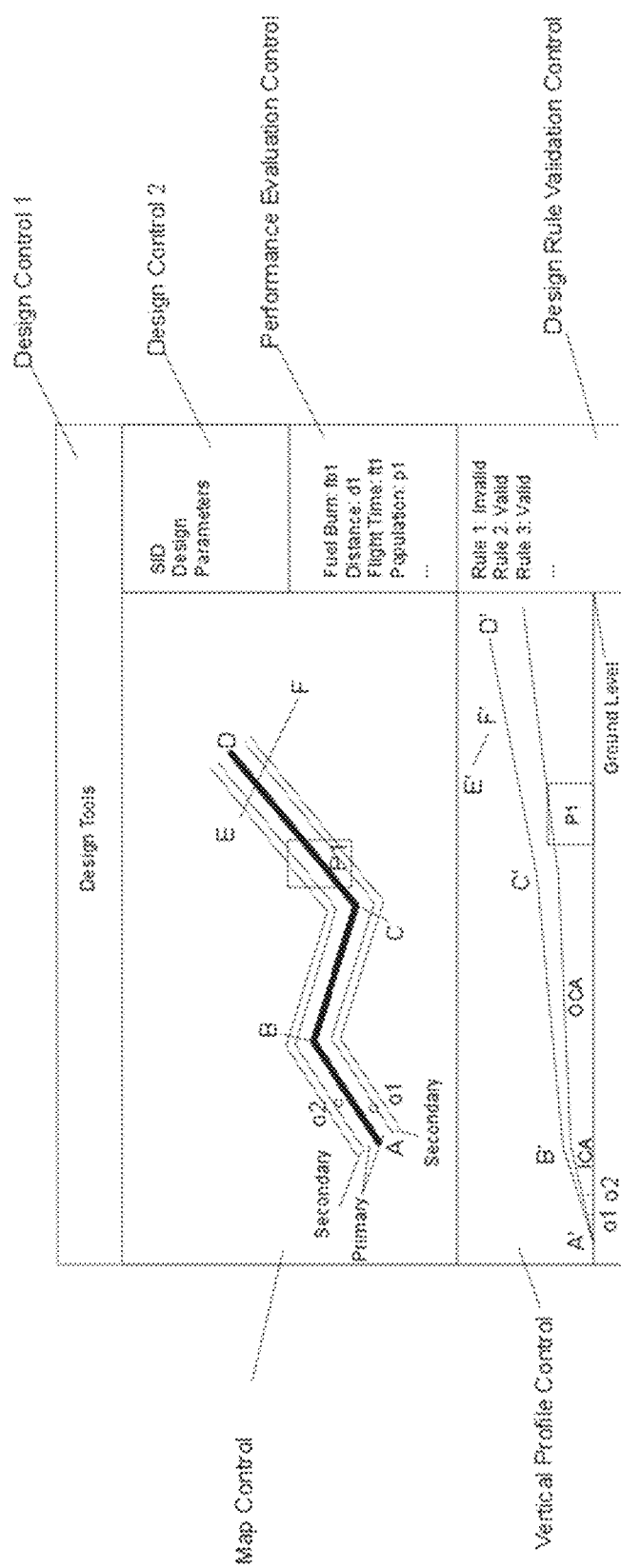
FIG. 4A illustrates an example of an airspace design procedure using AIM.
Figure 4B:
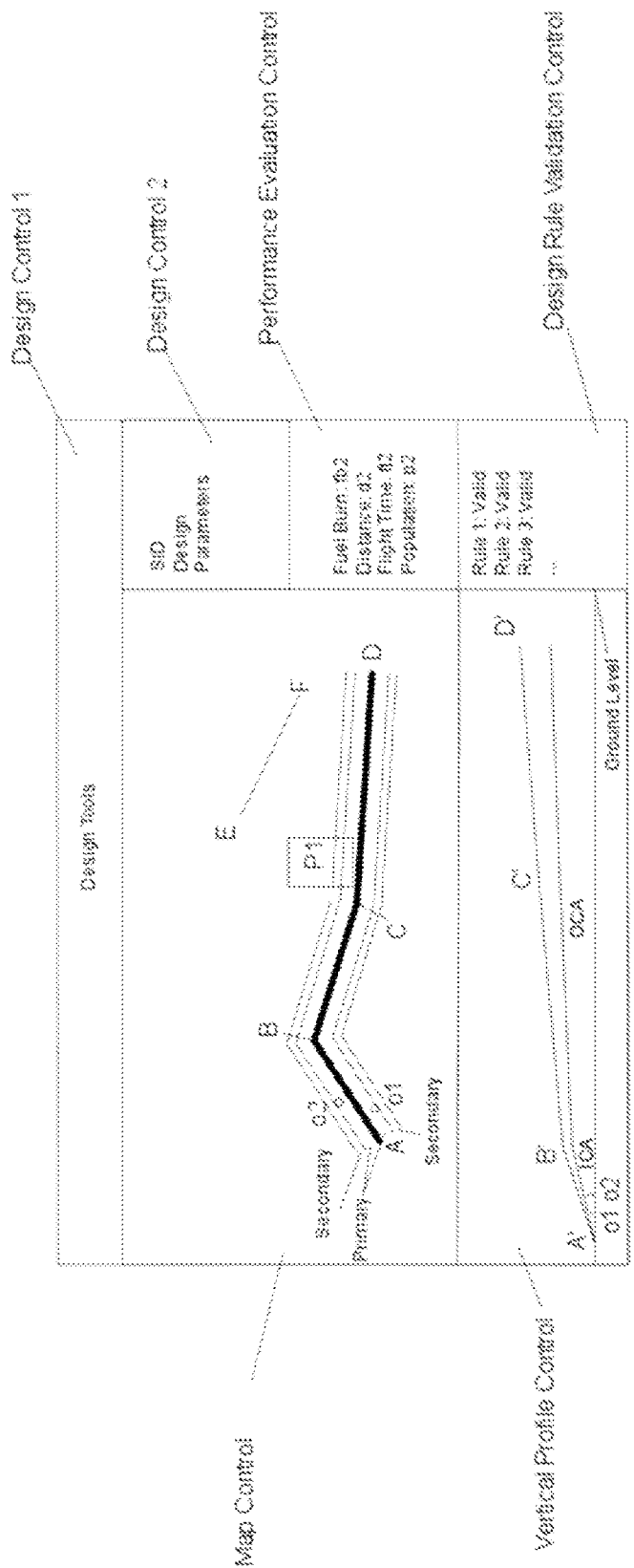
FIG. 4B illustrates another example of an airspace design procedure using AIM.

Amongst other benefits and features, a key benefit of the AIM systems and methods is their capability to enable holistic modeling of all airspace interactions combined with performance evaluation. The importance of this benefit can be demonstrated for procedure design using the AIM systems. FIGS. 4A and 4B illustrate two examples of a procedure being designed with the AIM system. Several AIM UI elements are common in both figures and include:
Design control 1
Design control 2
Map control
Vertical profile control
Performance evaluation control
Design rules validation control Design controls 1 and 2 provide tools for the parameterization and design of a standard instrument departure (SID) procedure. Such parameterization could include the airport and runway for which the SID is being designed, SID naming following the typical convention, a top altitude restriction for ATC, the SID type (e.g. RNAV 1), etc.

The map control displays the construction of the SID in 2-D using an adequate map projection (e.g., equirectangular or geographic projection). Elements displayed in the map control include:
SID legs (bold centerline A-B-C-D)
Obstacle data (obstacles o1 and o2 depicted as circles)
Population zone (depicted as a rectangle P1)
Neighboring route (straight segment E-F)
Primary and secondary obstacle clearance areas (depicted as two sets of parallel lines on each side of the bold centerline A-B-C-D)

In this example, the primary and secondary OCAs are designed by the design module using information from the design rule library.

The vertical profile control displays the vertical information of the SID route being designed (route mileage against altitude), along with the perpendicular projections to the SID route centerline (A-B-C-D) of all other elements depicted in the map control which interact with the SID route within the OCA boundaries.

The performance evaluation control displays performance metrics for the SID route being designed. In this example, the following metrics are considered: fuel burn, distance, flight time, population, but other metrics could be estimated too.

The design rules validation control displays the results of the design rule and criteria for each instance of the SID route construction, as they are calculated by the design module. In this example we consider a total of three design rules being checked: design rule 1, design rule 2 and design rule 3.

FIGS. 4A and 4B illustrate two consecutive examples of designing a SID route. Once the user has set their preferences using design controls 1 and 2, they can start designing the route by clicking on desired locations in the map control to create consecutive SID waypoints. Every time they create a new waypoint, a SID leg (straight segment between previous and current waypoint, e.g. A-B) is instantly created in the map view. At the same time the vertical profile of each SID segment is automatically created. For example, for SID leg A-B in the map control, the equivalent vertical profile A'-B' is created automatically in the vertical profile control. The user has the option to edit the climb gradient, i.e., the slope of A'-B', and this can be simply done by scrolling the wheel of the mouse. Furthermore, while the user locates the horizontal and vertical locations of the SID waypoints, the primary and secondary areas for the initial climb area (ICA) and obstacle clearance area (OCA) are automatically created and displayed in both the map and vertical profile controls. Obstacles and other elements within the ICA and OCA are captured from the map control and automatically displayed in the vertical profile control, e.g. obstacles o1 and o2. In FIG. 4A and for SID leg C-D, there is a population zone P1 underneath the SID path. The boundaries of this population zone are also depicted in the vertical profile control.

Continuing with this example, it is assumed the user has already created SID legs and waypoints up to waypoint C, and is now trying to create the new waypoint D. FIGS. 4A and 4B illustrate two potential locations for point D, meaning that the user has the capability to examine consecutive positions for locating the new waypoint, and while doing that be able to observe all interactions of the new SID segment with all airspace elements, the expected performance as displayed by the performance evaluation control and whether the new SID segment will abide to design rules and criteria as displayed by the design rules validation control. In this example, when examining the first position for point D in FIG. 4A, the user is able to see that if they were to choose that location current estimates for performance: fuel burn fb 1, distance d1, flight time ft1, population p1 (displayed in the performance evaluation control), while in terms of design that design rule 1 is invalid, design rule 2 is valid and design rule 3 is valid (from the design validation control).

When considering a new location for point D in FIG. 4B, the user is again aware of the interactions of the SID route with neighboring airspace elements as they are updated and displayed in the map and vertical profile control, and in terms of performance that the new performance would be fuel burn fb2, distance d2, flight time ft2, population p2 (displayed in the performance evaluation control), while in terms of design that design rule 1 is now valid, design rule 2 is valid and design rule 3 is valid (from the design validation control).

Thus, the AIM systems and methods enable the calculation of all the above metrics and the ability to provide an instantaneous display to the user for all positions between the ones examined in FIGS. 4A and 4B, thus providing a capability for real-design-feedback to the user.

In another example with regards to the design rules validation control results, the rule verification and documentation for US TERPS is illustrated in FIG. 5.

As illustrated in FIG. 5, the first column, "Rule Validity" evaluates the validity of each rule that is relevant with the current object being designed. The validity of each rule is described both verbatim, whereas a rule may be "valid" or "invalid" and is also displayed with a visual indication using a circle, which may be filled with color to indicate the validity: "diagonal hatching" for valid, "cross hatching" for invalid, and "horizontal hatching" for rules that require approval. Furthermore, when a rule is invalid, AIM displays the exact reason for which the current design does not abide to the rule specification, so that the user may take the necessary design corrective actions. The second column, "Rule Description," provides a detailed description of each relevant rule. The third column, "Enforcement Type," distinguishes between "Mandatory" and rules that "Require Approval." The latter category refers to design rules that may be valid under given circumstances. The fourth, fifth and sixth columns, "Source", "Version" and "Paragraph" respectively, display the original source, version and paragraph respectively of the design manual where the rules are originally specified, which the user may use as a reference.

In some embodiments, the design rules displayed and evaluated during the design of a specific element are evaluated at every design instance and are automatically updated given each design state of the object being designed. For example, as illustrated in FIG. 5, more lines may be added after the evaluation of the four rules in this example, if such circumstances arise from the design, and this is done automatically using the design module of the AIM architecture.

Figure 6:
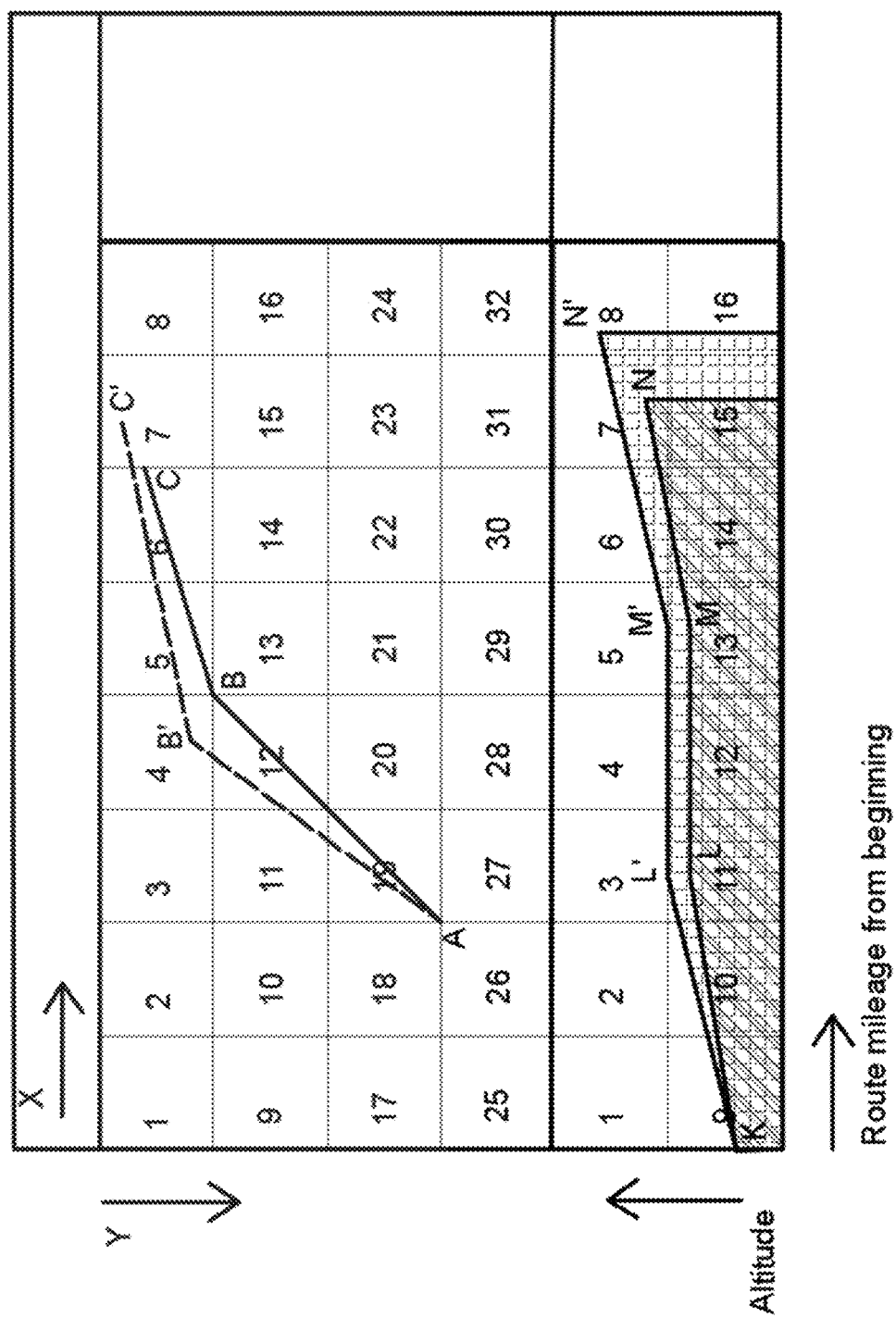
FIG. 6 illustrates an example of the dynamic evaluation of key performance indicators (KPIs).

In other embodiments, the AIM enables the dynamic evaluation and visualization of the quality of a design given specific Key Performance Indicators (KPIs) and design criteria for customizing a user defined or existing design. FIG. 6 illustrates an existing design with horizontal alignment characterized by the continuous line of points A, B and C shown in the map control and with vertical alignment characterized by the continuous line of points K, L, M and N, shown in the vertical profile control. In the vertical profile control, the inclined lines hatch area underneath the K, L, M and N continuous line indicates the performance of the route design for a given KPI, (this could be done for different KPIs, e.g. the total noise exposure created by the route). Each KPI is calculated by the performance evaluation module and the AIM feeds this calculation directly into the UI. To modify this existing design, the user may select a vertex in the horizontal alignment, for example vertex B and then move it to the position indicated by point B'. Subsequently, the user may modify the position of vertex C and move it to the position of point C'.

In some embodiments, and to provide an advisory to the user, AIM continuously updates the vertical profile of the route (using its projection) to update its vertical geometry and interaction with neighboring elements (e.g., obstacles and population from the previous examples), while it also dynamically updates the underlying hatch to reflect the evaluation in terms of a given KPI. Typically, the hatch would range between two colors, e.g. red to green, to indicate improvement or deterioration of a KPI. In this example, red hatch color may be used to indicate deterioration of the KPI (in the example of noise, this would mean increased noise impact), while green may be used to indicate improvement of the KPI (in the example of noise, this would mean reduced noise impact). It is noted that the colors, geometry of route and other elements relevant to the design are calculated and updated constantly and reflect all intermediate states of the system while the user hovers around the map area searching for a location for a route vertex, thus providing the user with a real-design-time advisory and feedback to guide their design choices.

In some embodiments, the KPI is displayed using a graphic scale, the limits of which can be edited by the user, the performance evaluation module also provides the complete calculation for the relevant metric, e.g. for noise evaluation the calculation of noise contours using daylight noise levels in dB and complete set of noise metrics.

In some embodiments, the above features and applications of the AIM may be available simultaneously for the evaluation of a single route, meaning that the design rule criteria evaluation described in FIG. 5 and the examples in FIGS. 4A and 4B are also available.

Interactive System Management

In some embodiments, AIM's versatile architecture and completeness of airspace and airport(s) system data and information provides the user with an interactive system management. In the map control, the user may access all available system information using a versatile layer management menu. The layer management menu enables Geographic Information System (GIS) capabilities, which are further enhanced as each element within a given category is also modeled in the AIM and thus its geometric or operational properties may be directly modified, while all interdependent elements would be automatically updated to reflect this modification.

In airport operations, runways are used in both directions for both arrival and departure operations. This is designated by the runway orientation given its direction of movement. For example, LaGuardia Airport (LGA) may operate departure on Runway 31 (31 means approximate magnetic bearing of 310 degrees) for a period of time and at a different period may operate departures on Runway 13 (~130 degrees of magnetic bearing), which is the same runway but with opposite direction of movement. Each state of runway operations is designated based on its direction of movement for a given type of operation (arrivals, departure, or mixed mode) and the term typically used to describe this mode of operation is runway configuration. A set of runway configurations in a given airport in a given time period results in the configuration of the airport, while a set of airport configurations in an airport system (e.g., a metroplex) results in the airport system configuration. Runway configurations typically change due to wind but may also change given various other technical requirements (e.g., aircraft performance). In the case of a system of airports, e.g., a metroplex, the runway configurations of each airport are interdependent with the runway configurations of the other neighboring airports, as there may be overlapping airspace if two or more airports need to use the same portion of airspace. This creates a complex problem that has direct results in the capacity of the airport system (both airport and airspace capacity) due to conflicting airspaces, adds to the complexity of the airspace and airport(s) system design and ultimately limits the effective management of the airport system resources.

Figure 7:
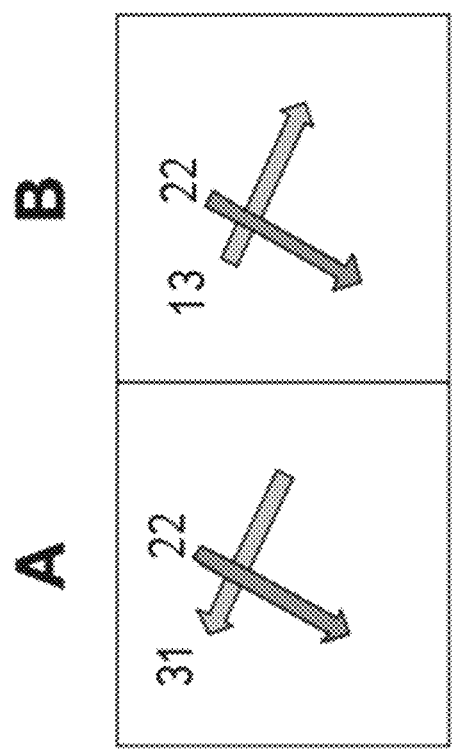
FIG. 7 illustrates an example of a runway configuration selection tool.

In terms of the design process, each runway configuration corresponds to a specific subset of procedures and not the entirety of the available procedures for that airport (e.g., only the subset of the departure procedures that take-off in LGA departures 31 in the direction of ~310 degrees of magnetic bearing are active given that configuration, while the ones on 13 are not active). To reduce complexity, AIM enables the interactive management of runway configurations, by only displaying the active procedures that correspond to a selected active runway and airport configuration. FIG. 7 illustrates an example of this: in instance A on the left, LGA operates departures on 31. The user may change the configuration simply by clicking on the runway (in this case 31). Once this action is performed, the runway configuration automatically updates to instance B on the right of FIG. 7, while the GIS system enabled by the layer management menu instantly updates to only display the available procedures that correspond to the active runway configuration. This tool may be used to manage the configuration for all the airports that are loaded in the AIM. This is particularly useful for a metroplex, where efficient management and monitoring of the status of the system is cumbersome with current tools. This tool may be used for the management of existing procedures or to design new ones and sequentially assign them to a given configuration. Lastly, the user may save different sets of configurations, in order to produce designs for each configuration. This may be particularly useful for studying and improving designs for all possible instances of the system, while also for testing new configurations that may be enabled by technology improvements, e.g., the use of performance based navigation (PBN), which has not been possible with conventional navigation aids.

Auto-Assignment to Terminal Fixes and Regulatory Airways

In some embodiments, AIM enables the user to automatically assess the capacity loading of terminal and en-route airspace resources at the design stage. In this use case, AIM automatically assigns air traffic demand to the terminal fix and terminal airspace procedure that correspond to the shortest path to each flight's origin or destination. This is achieved in the following manner: for each flight the 2D intersection point of the shortest path geodesic line and the terminal airspace boundary (typically referred to as Terminal Route Approach Control (TRACON) in the US or Terminal Maneuvering Area (TMA) in Europe and rest of the world) is calculated in terms of its geographic coordinates (based on the global WGS84 ellipsoid, on which GPS coordinates are based). Subsequently, the distance of this intersection point to all available terminal fixes for a given airport is calculated and each flight is assigned to the available terminal fix and procedure that minimizes the above criterion. This results in the automatic flight plan creation and routing assignment for all flights. The resulting flight plans are displayed in a table, including all relevant elements that describe the flight (call sign, aircraft type, airline, etc.) and routing (routes, fixes, etc.), while each entry of the table is also complemented by a terminal fix capacity loading index (ranging from 0 to 100%) and a terminal procedure loading index (ranging from 0 to 100%) and a regulatory airway (en-route ATS route selection) loading index (ranging from 0 to 100%). The above metrics are calculated by the performance evaluation module of the AIM and are directly updated for the air traffic demand assignment. The user may re-assign flight plans to different terminal fixes, terminal procedures and ATS routes to better balance capacity demand loading of each element. The resulting assignment may then be used as input to run fast-time simulation for the complete evaluation of the design.

Time-Based Demand Selection and Filtering

Figure 8:
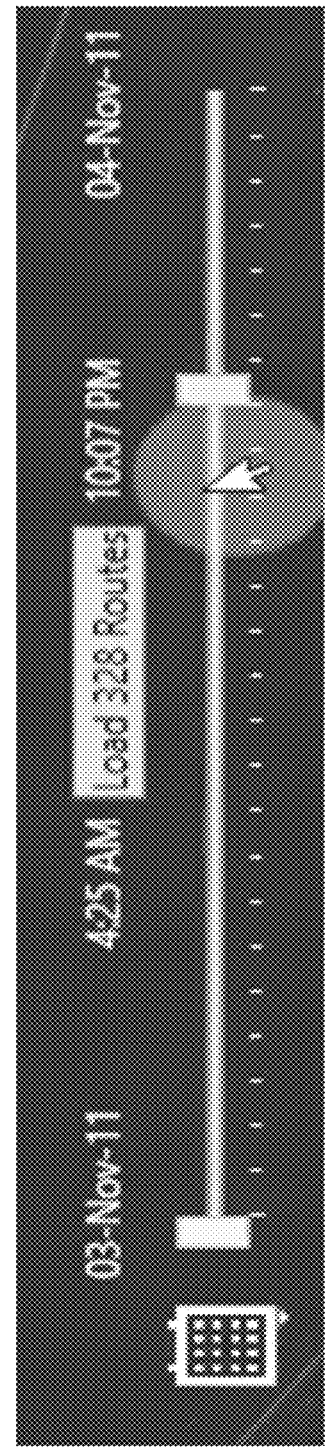
FIG. 8 illustrates an example of a time-based demand selection slider.

In some embodiments, AIM supports importing a variety of air traffic demand data types, including but not limited to schedule data, ARINC 424 data, etc. Following the importing of external air traffic demand data, AIM enables time-based demand selection. For this, a horizontal time slider tool is used, as illustrated in FIG. 8. The imported data populates the timeline and the user may select a specific period of the day simply by dragging the one or more sliders. The number of routes included in each time period is displayed and dynamically updated as the user moves the sliders. When a desirable selection is made, the selected flights are instantly loaded and displayed to the user in the map control. If the data only contain origin-destination information, then great circle paths are displayed, while, if complete trajectories are available, then the exact flight paths are displayed.

TERPS/PANS-OPS/Custom Rules

Figure 9:
FIG. 9 illustrates an example of an active design rules button.

In some embodiments, AIM supports the modeling and enforcement of design criteria in its design module of different sets of design rules. These rules include but are not limited to TERPS, ICAO PANS-OPS, etc. Furthermore, AIM supports the modeling and enforcement of custom imposed rules, which may be useful for airline procedure design "outside criteria." The design rules are modeled in the design module and may be modified by the user. Once the design rules are set, the user may alternate between different design rules, simply by selecting the relevant design rules set by activating an "on/off" switch (e.g., as illustrated in FIG. 9). Once a set of design rules is activated, all design requirements and constraints are instantly updated to abide by the active set of design rules. For example, in the procedure design of FIGS. 4A and 4B, the active rules would correspond to the selected design rules.

Multiple Project Views

In some embodiments, AIM supports the modeling of multiple projects, management of multiple project views, and merging of projects. The user may work on individual projects, each of which is contained within a specific tab. The user may switch between projects, simply by selecting the relevant tab. The user may also merge two different projects, by dragging and dropping a tab on top of the other tab: an option will appear that enables the merging of the two projects. When two projects are merged together, all objects and their interdependencies are updated on the new merged project. The new interdependencies between the objects of the individual projects are also created. The merging of projects may be particularly useful for studying neighboring airports, airport systems, or wider areas of interest, e.g., the North-East Corridor, including the airspaces of Washington D.C., Philadelphia, New York and Boston.

Scenario Builder and Comparison

In some embodiments, AIM enables scenario building and allows the user to save specific designs. Once the user has concluded a design, they are able to save all its parameters and assign a designation to it. AIM enables comparison of multiple scenarios side-by-side, whereas a relevant view snapshot (e.g., map control and vertical profile control for the case of route comparison) from both scenarios are displayed side-by-side. For example, when comparing two proposed route designs using noise as the evaluation KPI, displays as illustrated in FIGS. 4A and 4B may be used, accompanied by comparison tables of the analytical KPI results.

Airport Surface Modeling

In some embodiments, AIM supports the modeling of airport surface operations. These may refer to any relevant aircraft operation and state on the surface of the airport, including gate, apron, taxiway, runway, parking, de-icing, etc. AIM supports detailed and complete routing of aircraft throughout the entirety of the turn-around cycle, while the performance evaluation module enables the quantification of performance metrics from the turn-around cycle covering the entire end-to-end flight phases through the terminal and en-route phases to the destination airport.

Live Flight Tracking and Analysis

In some embodiments, AIM supports the live flight tracking using an external data source (e.g. OpenSky Network data). This enables the real-time display of aircraft information on the map control. Moreover, the airspace information contained in the core parametric model, enable the matching of live aircraft data to current airspace and airport configuration elements. This in turn enables the estimation of additional live performance metrics, such as live capacity of specific components (e.g. runway, SID route, Departure fixes, airspace sectors, airspace system, etc.). Furthermore, the capabilities of the Design Module related to design of new procedures and new airspaces, allow post-operational analysis for alternate design scenarios using historic or new air traffic demand data, enabling the estimation of system performance under difference configurations, and what-if scenario analyses.

Example Methods and Implementations for Airspace Information Modeling

Figure 10:
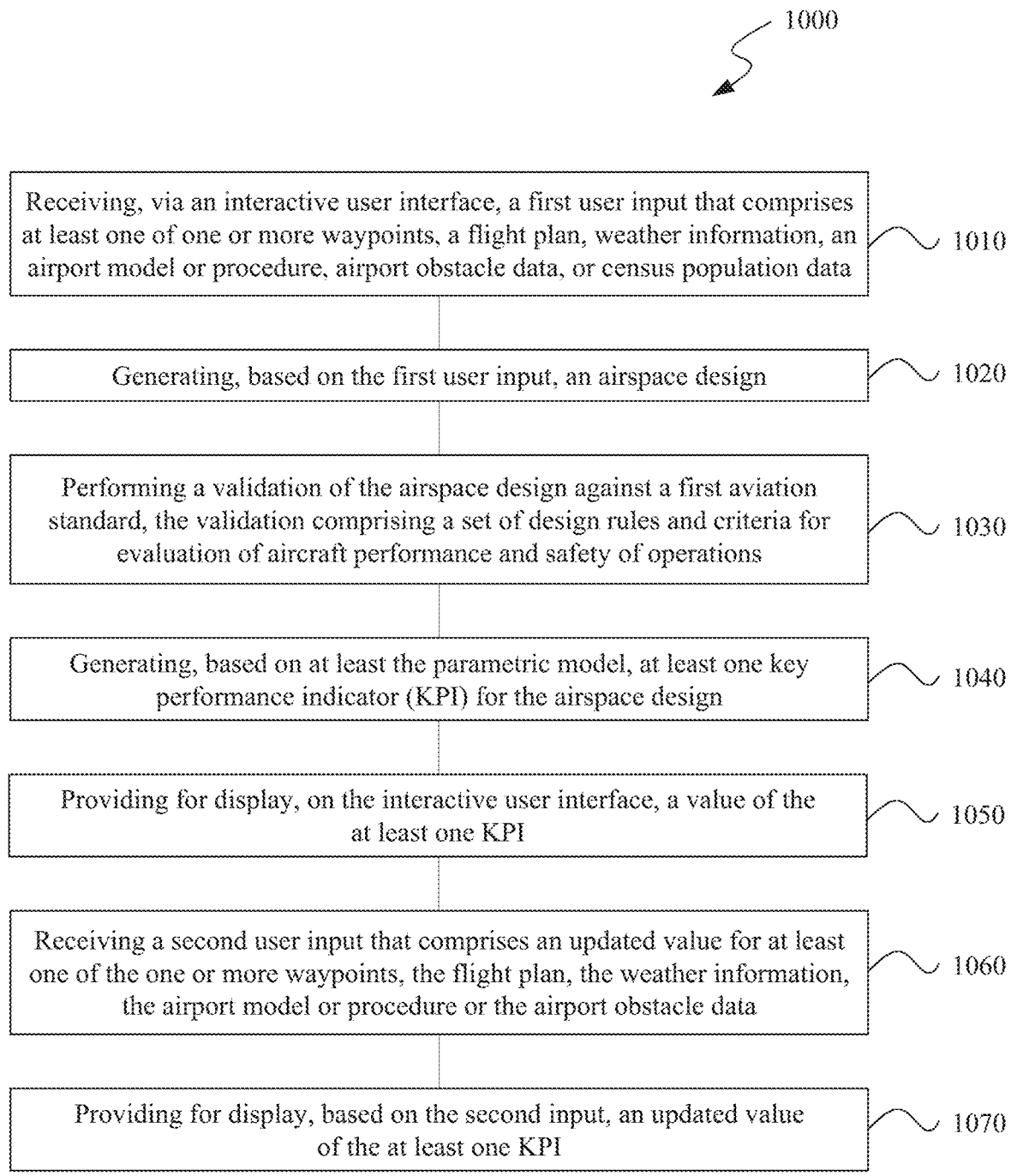
FIG. 10 is an example method flowchart for designing an improved airspace model.

FIG. 10 is a flowchart of an example method 1000 for airspace information modeling. The method 1000 includes, at operation 1010, receiving, via an interactive user interface, a first user input that comprises at least one of one or more waypoints, a flight plan, weather information, an airport model or procedure, airport obstacle data, or census population data.

The method 1000 includes, at operation 1020, generating, based on the first user input, an airspace design.

The method 1000 includes, at operation 1030, performing a validation of the airspace design against a first aviation standard, the validation comprising a set of design rules and criteria for evaluation of aircraft performance and safety of operations.

The method 1000 includes, at operation 1040, generating, based on at least the parametric model, at least one key performance indicator (KPI) for the airspace design, a KPI for the airspace design being a measurable value of an efficacy of a parameter or component of the airspace design.

The method 1000 includes, at operation 1050, providing for display, on the interactive user interface, a value of the at least one KPI.

The method 1000 includes, at operation 1060, receiving a second user input that comprises an updated value for at least one of the one or more waypoints, the flight plan, the weather information, the airport model or procedure or the airport obstacle data.

The method 1000 includes, at operation 1070, providing for display, based on the second input, an updated value of the at least one KPI.

In some embodiments, generating the airspace design comprises identifying a geometric property associated with the first user input, and assigning, based the geometric property, at least one aviation-specific property to the first user input, wherein the airspace design is based on the at least one aviation-specific property.

In some embodiments, the method 1000 further includes the operations of configuring the one or more waypoints, the flight plan, the airport model or procedure or the airport obstacle data, or activating or deactivating one or more of the set of design rules, or configuring the first aviation standard or selecting a second aviation standard different from the first aviation standard.

In some embodiments, the at least one KPI comprising an indication of airplane performance, an indication of environmental performance, or an indication of airport or airspace system performance.

In some embodiments, the indication of airplane performance comprising a fuel burn, a distance traveled, a flight time or an engine-out or all-engine performance.

In some embodiments, the indication of environmental performance comprising a noise level contour map or a measure of emission volume.

In some embodiments, the airspace design comprising a flight segment between a first waypoint and a second waypoint of the one or more waypoints, and the noise level contour map for an area adjacent to the flight segment being computed by measuring a noise impact at a plurality of points along the flight segment, and implementing a Delaunay triangulation followed by a linear interpolation to produce contours of the noise level contour map.

In some embodiments, the indication of airport or airspace system performance comprising an airport runway capacity, an airport taxiway capacity, an airport gate capacity or an airspace sector capacity.

In some embodiments, the first aviation standard comprising the United States Standard for Terminal Instrument Procedures (TERPS), the United States Standard for Performance Based Navigation (PBN) Instrument Procedure Design, or the ICAO Document 8168 for Procedures of Air Navigation Services and Aircraft Operations (PANS-OPS).

Figure 11:
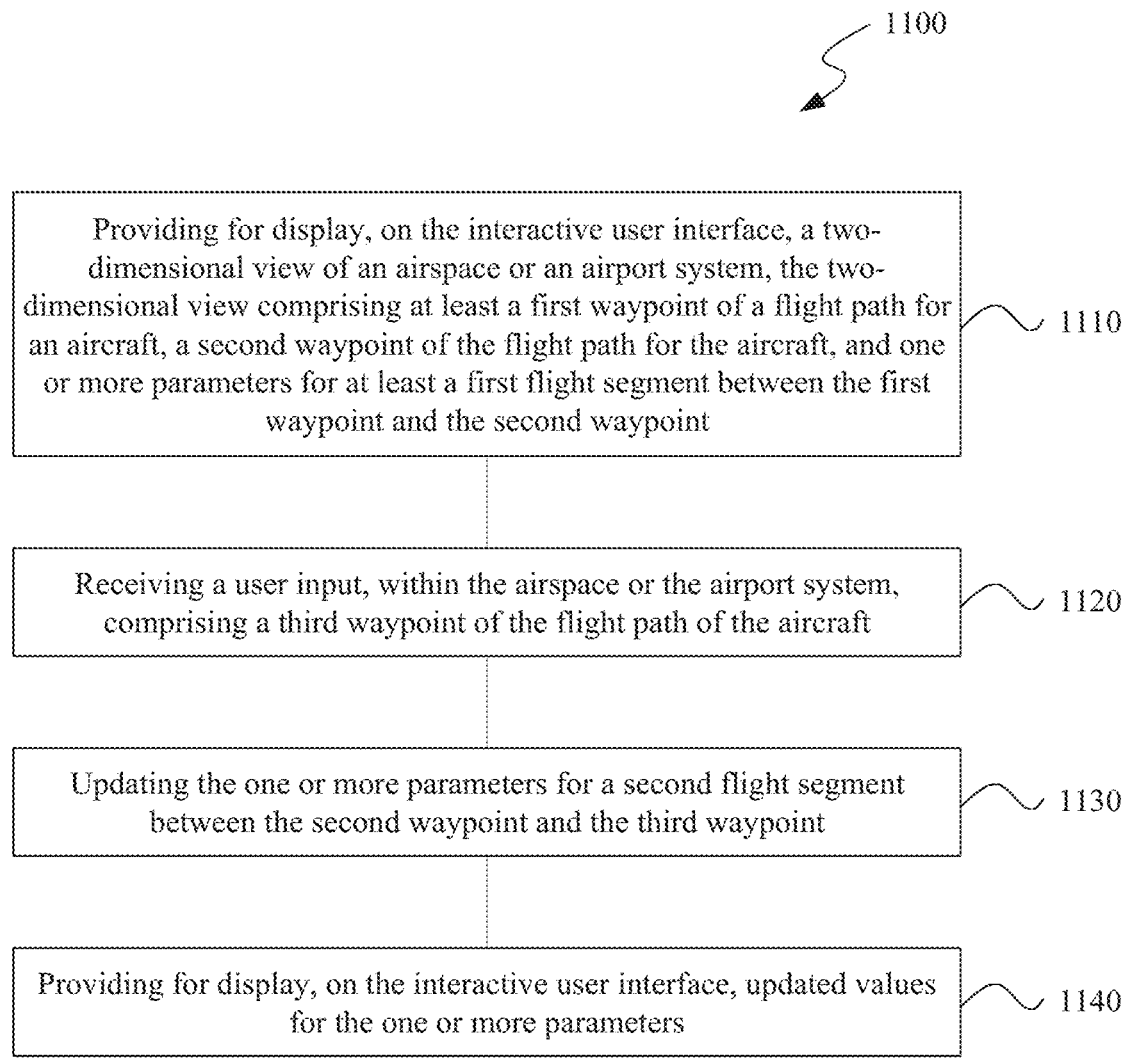
FIG. 11 is another example method flowchart for designing an improved airspace model, which includes creating a new design.

FIG. 11 is a flowchart of an example method 1100 for airspace information modeling. The method 1100 includes, at operation 1110, providing for display, on the interactive user interface, a two-dimensional view of an airspace or an airport system, the two-dimensional view comprising at least a first waypoint of a flight path for an aircraft, a second waypoint of the flight path for the aircraft, and one or more parameters for at least a first flight segment between the first waypoint and the second waypoint. In some embodiments, the one or more parameters include a vertical profile including a climb gradient, a fuel burn for the aircraft, a distance traveled and a flight time for the first flight segment, or a population map or a noise level contour map for an area surrounding the first flight segment.

The method 1100 includes, at operation 1120, receiving a user input, within the airspace or the airport system, comprising a third waypoint of the flight path of the aircraft.

The method 1100 includes, at operation 1130, updating the one or more parameters for a second flight segment between the second waypoint and the third waypoint.

The method 1100 includes, at operation 1140, providing for display, on the interactive user interface, updated values for the one or more parameters.

Figure 12:
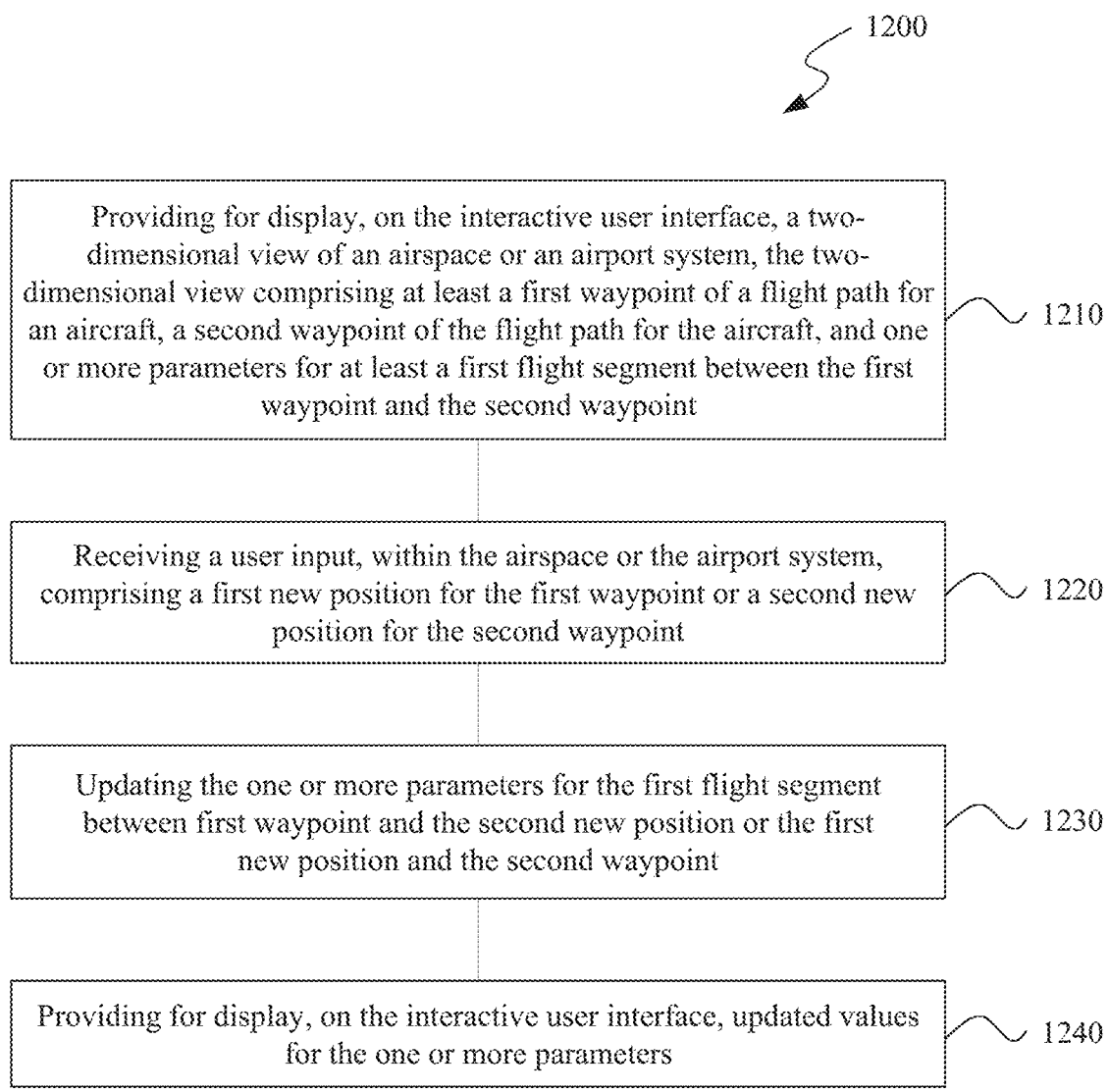
FIG. 12 is yet another example method flowchart for designing an improved airspace model, which includes modifying an existing design.

FIG. 12 is a flowchart of an example method 1200 for airspace information modeling. The method 1200 includes, at operation 1210, providing for display, on the interactive user interface, a two-dimensional view of an airspace or an airport system, the two-dimensional view comprising at least a first waypoint of a flight path for an aircraft, a second waypoint of the flight path for the aircraft, and one or more parameters for at least a first flight segment between the first waypoint and the second waypoint. In some embodiments, the one or more parameters include a vertical profile including a climb gradient, a fuel burn for the aircraft, a distance traveled and a flight time for the first flight segment, or a population map or a noise level contour map for an area surrounding the first flight segment.

The method 1200 includes, at operation 1220, receiving a user input, within the airspace or the airport system, comprising a first new position for the first waypoint or a second new position for the second waypoint.

The method 1200 includes, at operation 1230, updating the one or more parameters for the first flight segment between first waypoint and the second new position or the first new position and the second waypoint.

The method 1200 includes, at operation 1240, providing for display, on the interactive user interface, updated values for the one or more parameters.

Figure 13:
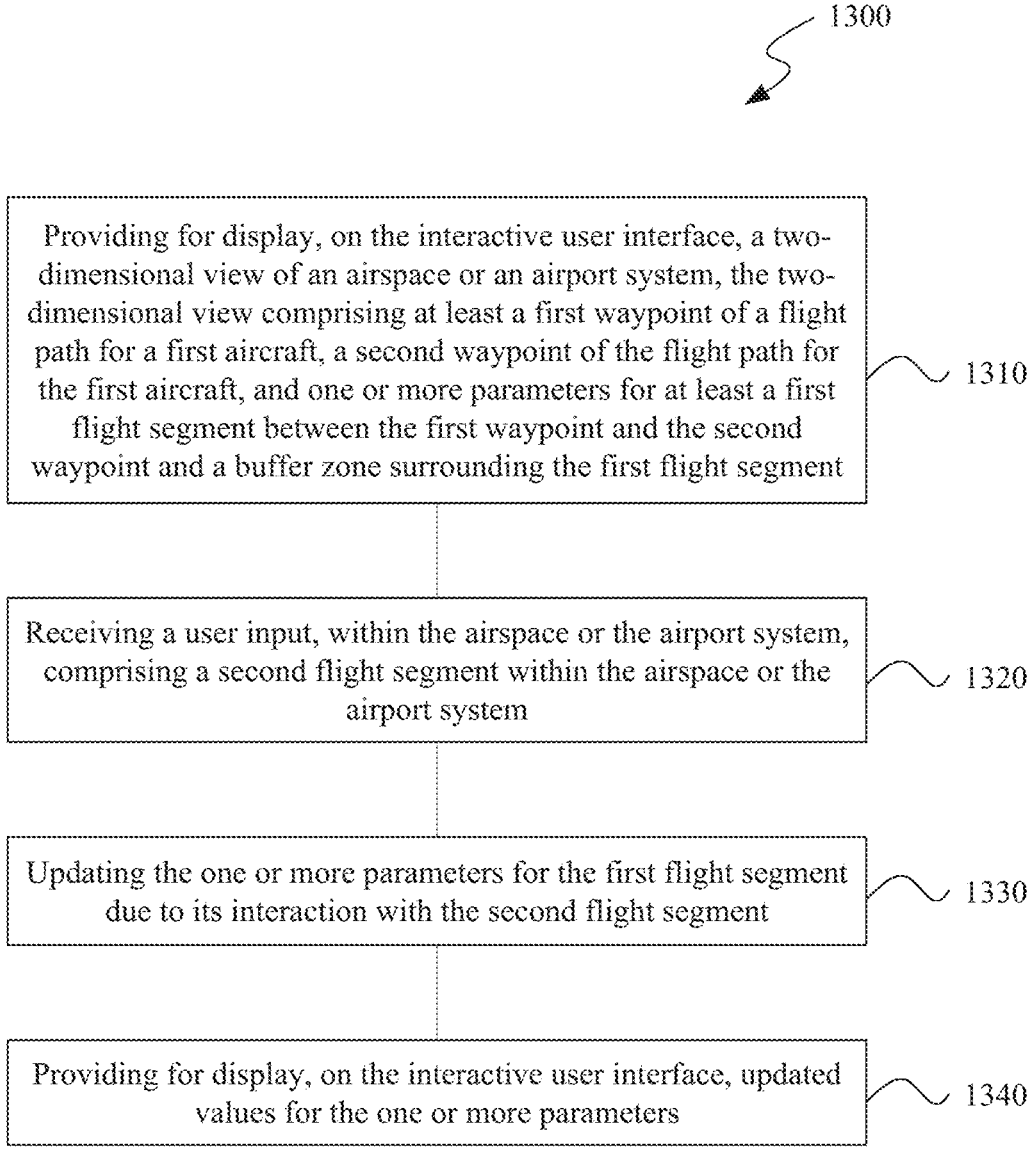
FIG. 13 is yet another example method flowchart for designing an improved airspace model, which includes analyzing interactions between designs.

FIG. 13 is a flowchart of an example method 1300 for airspace information modeling. The method 1300 includes, at operation 1310, providing for display, on the interactive user interface, a two-dimensional view of an airspace or an airport system, the two-dimensional view comprising at least a first waypoint of a flight path for a first aircraft, a second waypoint of the flight path for the first aircraft, and one or more parameters for at least a first flight segment between the first waypoint and the second waypoint and a buffer zone surrounding the first flight segment. In some embodiments, the one or more parameters include a vertical climb gradient, obstacle data or a key performance indicator (KPI).

The method 1300 includes, at operation 1320, receiving a user input, within the airspace or the airport system, comprising a second flight segment within the airspace or the airport system.

The method 1300 includes, at operation 1330, updating the one or more parameters for the first flight segment due to its interaction with the second flight segment.

The method 1300 includes, at operation 1340, providing for display, on the interactive user interface, updated values for the one or more parameters.

Figure 14:
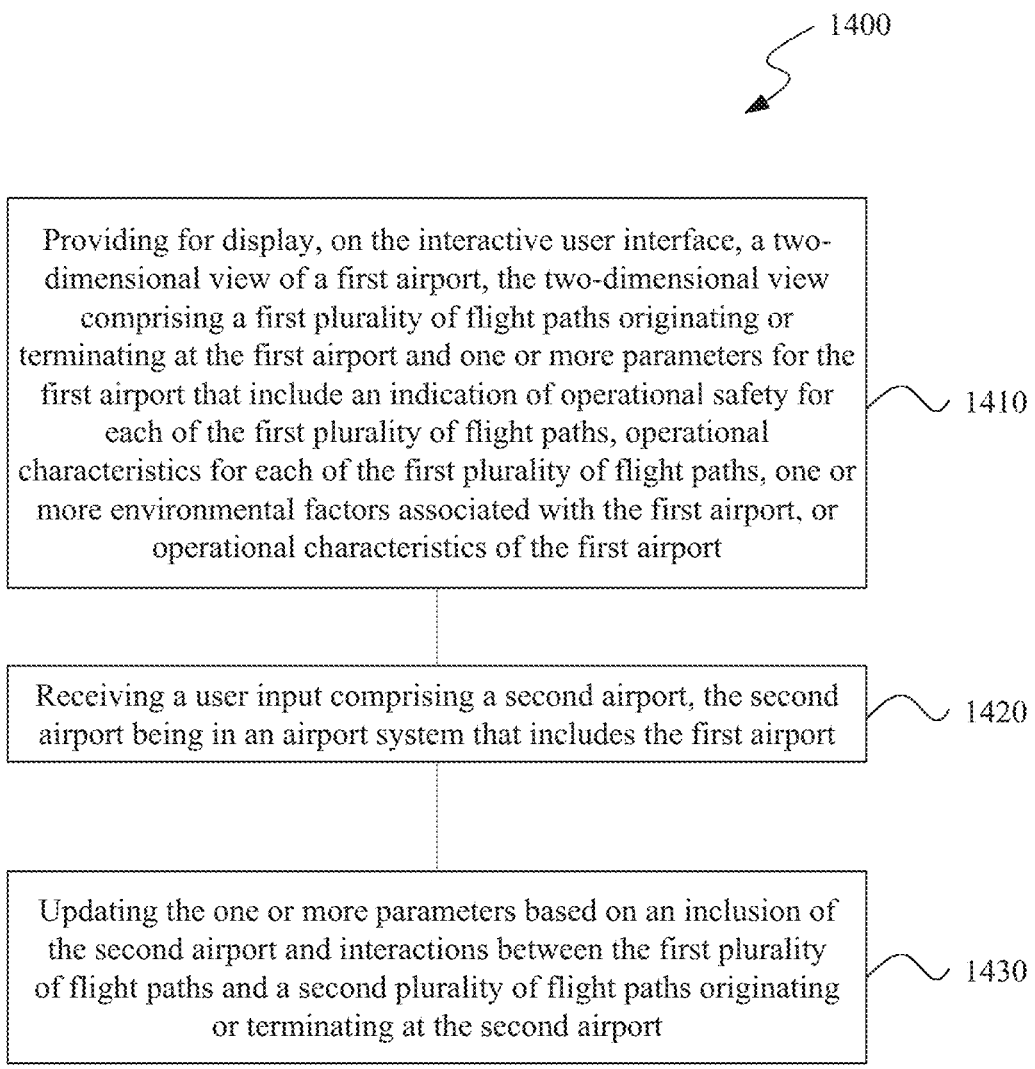
FIG. 14 is yet another example method flowchart for designing an improved airspace model, which includes a holistic evaluation of an airspace or airport system.

FIG. 14 is a flowchart of an example method 1400 for airspace information modeling. The method 1400 includes, at operation 1410, providing for display, on the interactive user interface, a two-dimensional view of a first airport, the two-dimensional view comprising a first plurality of flight paths originating or terminating at the first airport and one or more parameters for the first airport, the one or more parameters comprising at least one of an indication of operational safety for each of the first plurality of flight paths, operational characteristics for each of the first plurality of flight paths including a fuel burn, a runway configuration, a distance or a flight time, one or more environmental factors associated with the first airport including a noise level contour map for the first airport or emissions associated with aircrafts on each of the first plurality of flight paths, or operational characteristics of the first airport including capacity and throughput.

The method 1400 includes, at operation 1420, receiving a user input comprising a second airport, the second airport being in an airport system that includes the first airport.

The method 1400 includes, at operation 1430, updating the one or more parameters based on an inclusion of the second airport and interactions between the first plurality of flight paths and a second plurality of flight paths originating or terminating at the second airport.

Embodiments of the disclosed technology include systems and methods for creating a new design (e.g., adding a waypoint as illustrated in FIGS. 4A and 4B). In some embodiments, a system for airspace information modeling comprises a processor, a memory, and an interactive user interface that is configured to: display a two-dimensional view of an airspace or an airport system, the two-dimensional view comprising at least a first waypoint of a flight path for an aircraft, a second waypoint of the flight path for the aircraft, and one or more parameters for at least a first flight segment between the first waypoint and the second waypoint, and accept a user input, within the airspace or the airport system, comprising a third waypoint of the flight path of the aircraft, wherein the one or more parameters comprise a vertical profile including a climb gradient, a fuel burn for the aircraft, a distance traveled and a flight time for the flight segment, or a population map or a noise level contour map for an area surrounding the flight segment, wherein the processor is configured to update the one or more parameters for a second flight segment between the second waypoint and the third waypoint, and wherein the interactive user interface is further configured to display updated values for the one or more parameters.

Embodiments of the disclosed technology include systems and methods for modifying an existing design (e.g., relocating a waypoint as illustrated in FIG. 6). In some embodiments, a system for airspace information modeling comprises a processor, a memory, and an interactive user interface that is configured to: display a two-dimensional view of an airspace or an airport system, the two-dimensional view comprising at least a first waypoint of a flight path for an aircraft, a second waypoint of the flight path for the aircraft, and one or more parameters for at least a first flight segment between the first waypoint and the second waypoint, accept a user input, within the airspace or the airport system, comprising a first new position for the first waypoint or a second new position for the second waypoint, wherein the one or more parameters comprise a vertical profile including a climb gradient, a fuel burn for the aircraft, a distance traveled and a flight time for the flight segment, or a population map or a noise level contour map for an area surrounding the flight segment, wherein the processor is configured to update the one or more parameters for the first flight segment between first waypoint and the second new position or the first new position and the second waypoint, and wherein the interactive user interface is further configured to display updated values for the one or more parameters.

In some embodiments, the user input further comprises a change to the climb gradient, and wherein the processor is further configured to update the one or more parameters based on the change.

In some embodiments, the noise level contour map for the area is computed by measuring the noise impact at a first plurality of points along the first flight segment and a second plurality of points along the second flight segment, and implementing a Delaunay triangulation followed by a linear interpolation to produce contours of the noise level contour map.

In some embodiments, the one or more parameters is computed using a first methodology upon a determination that the first flight segment is above 10,000 feet and using a second methodology different from the first methodology upon a determination that the first flight segment is below 10,000 feet.

In some embodiments, the first flight segment comprises a departure from an airport of the airport system.

In some embodiments, the one or more parameters further comprise obstacle information or characteristics of a runway associated with the departure.

Embodiments of the disclosed technology include systems and methods for viewing interactions between rules and procedures (e.g., as illustrated in FIG. 4A). In some embodiments, a system for airspace information modeling comprises a processor, a memory, and an interactive user interface that is configured to: display a two-dimensional view of an airspace or an airport system, the two-dimensional view comprising at least a first waypoint of a flight path for a first aircraft, a second waypoint of the flight path for the first aircraft, and one or more parameters for at least a first flight segment between the first waypoint and the second waypoint and a buffer zone surrounding the first flight segment, and accept a user input, within the airspace or the airport system, comprising a second flight segment within the airspace or the airport system, wherein the one or more parameters comprise a vertical climb gradient, obstacle data or a key performance indicator (KPI), wherein the processor is configured to update the one or more parameters for the first flight segment due to its interaction with the second flight segment, and wherein the interactive user interface is further configured to display updated values for the one or more parameters.

In some embodiments, the second flight segment comprises a flight segment associated with a second aircraft that intersects the flight path of the first aircraft.

In some embodiments, the second flight segment comprises an virtual flight segment to generate an analysis for the first flight segment.

In some embodiments, the analysis comprises a set of design rules configured to ensure that values of the one or more parameters remain within predetermined ranges.

In some embodiments, the one or more parameters further comprise a population map or a noise level contour map for an area surrounding the first flight segment and the buffer zone.

Embodiments of the disclosed technology include systems and methods for a holistic evaluation of an airspace or airport system. In some embodiments, a system for airspace information modeling comprises a processor, a memory, and an interactive user interface that is configured to: display a two-dimensional view of a first airport, the two-dimensional view comprising a first plurality of flight paths originating or terminating at the first airport and one or more parameters for the first airport, wherein the one or more parameters comprise at least one of an indication of operational safety for each of the first plurality of flight paths, operational characteristics for each of the first plurality of flight paths including a fuel burn, a runway configuration, a distance or a flight time, one or more environmental factors associated with the first airport including a noise level contour map for the first airport or emissions associated with aircrafts on each of the first plurality of flight paths, or operational characteristics of the first airport including capacity and throughput.

In some embodiments, the interactive user interface is further configured to accept a user input comprising a second airport, the second airport being in an airport system that includes the first airport, and wherein the processor is configured to update the one or more parameters based on an inclusion of the second airport and interactions between the first plurality of flight paths and a second plurality of flight paths originating or terminating at the second airport.

In some embodiments, the two-dimensional view further comprises an airspace between the first airport and the second airport.

In some embodiments, the processor is further configured to modify at least one of the first plurality of flight paths or the second plurality of flight paths upon a determination that the interactions result in a violation of a design rule associated with the airport system.

Figure 15:
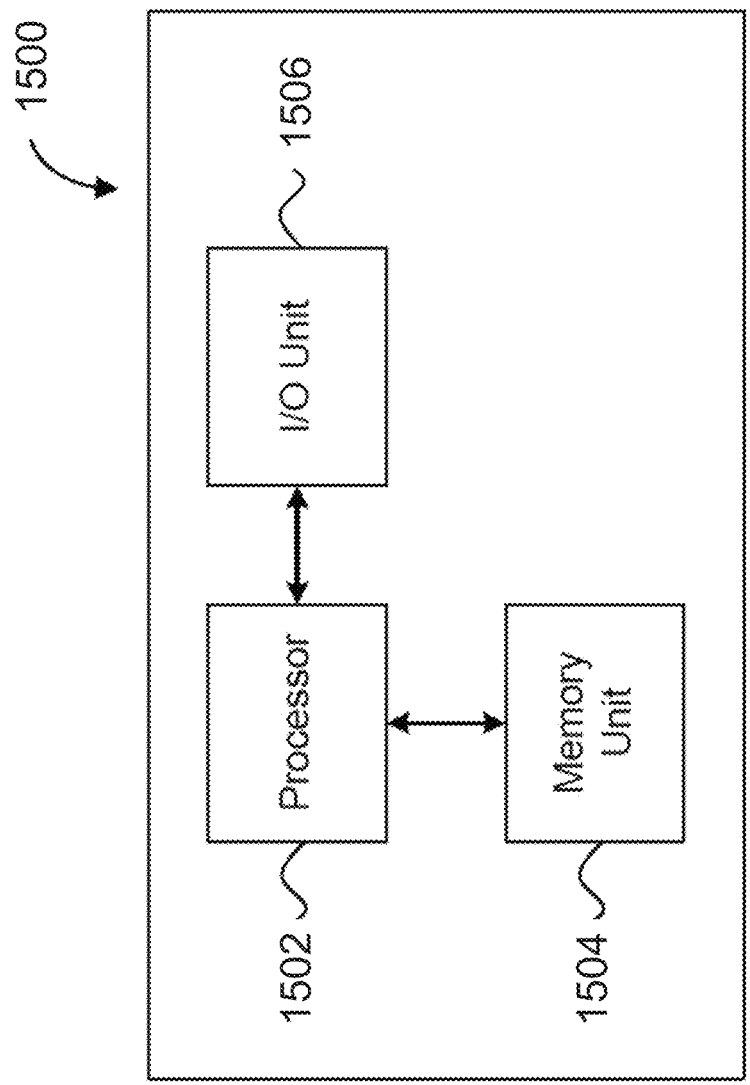
FIG. 15 is a block diagram of an example of a hardware platform for implementing a method or technique for airspace information modeling.

FIG. 15 shows a block diagram of an example embodiment of a device (or apparatus, hardware device or implementation) 1500 that implements the disclosed technology. The device includes a processor 1502 in communication with a memory unit 1504 and an input/output (I/O) unit 1506. The processor 1502 is configured to process data, and the memory unit 1504 is in communication with the processor to store and/or buffer the data. To support various functions of the device, the processor can be included to interface with and control operations of other devices, e.g., via the I/O unit 1506.

In various implementations, the processor 1502 can include one or more processors, e.g., including but not limited to microprocessors such as a central processing unit (CPU), microcontrollers, or the like. The memory unit 1504 can include and store processor-executable code, which when executed by the processor, configures the device to perform various operations, e.g., such as receiving information, commands, and/or data, processing information and data, and transmitting or providing information/data to another device. The memory unit can store other information and data, such as instructions, software, values, images, and other data processed or referenced by processor. For example, various types of Random Access Memory (RAM) devices, Read Only Memory (ROM) devices, Flash Memory devices, and other suitable storage media can be used to implement storage functions of memory unit. In some implementations, the device includes an input/output unit (I/O) 1506 to interface the processor and/or memory unit to other modules, units or devices associated with the system, and/or external devices. For example, the I/O unit can connect to an external interface, source of data storage, or display device. Various types of wired or wireless interfaces compatible with typical data communication standards, such as Universal Serial Bus (USB), IEEE 1394 (FireWire), BLUETOOTH®, Bluetooth low energy (BLE), ZIGBEE®, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE cellular communication methods, and parallel interfaces, can be used to communicate data with the device via the I/O unit. In some implementations, for example, the device 1500 includes a wireless communications unit, e.g., such as a transmitter (Tx) or a transmitter/receiver (Tx/Rx) unit. In such implementations, for example, the I/O unit can interface the processor and memory unit with the wireless communications unit to utilize various types of wireless interfaces, such as the examples described above. The I/O unit can interface with other external interfaces, sources of data storage, and/or visual or audio display devices, etc. to retrieve and transfer data and information that can be processed by the processor, stored in the memory unit, or exhibited on an output unit of a user device (e.g., display screen of a computing device) or an external device.

It is understood that the various disclosed embodiments may be implemented individually, or collectively, in devices comprised of electronic components, hardware and/or software modules and components. These devices, for example, may comprise a processor, a memory unit, an interface that are communicatively connected to each other, and may range from desktop and/or laptop computers, to mobile devices and the like. The processor and/or controller can be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

While this document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of improving an operation of an airspace or an airport system, comprising:
    producing, based on a first input received via a graphical user interface (GUI), a design configuration for the airspace or the airport system based on a parametric model comprising a set of parameters, wherein the first input comprises a set of first updated values for the set of parameters, wherein the set of parameters comprises at least one of: one or more waypoints, a flight plan, weather information, an airport model or procedure, airport obstacle data, or census population data, and wherein the GUI comprises a map control interface and a design tool control interface;
    generating, based on the first input, a value of at least one key performance indicator (KPI), wherein the at least one KPI comprises a measurable value of an efficacy of a parameter or component of the design configuration and wherein the at least one KPI is provided for display on the GUI,
        wherein, prior to generating the value of the at least one KPI, the design configuration is validated, based on a set of design rules and criteria for evaluation of aircraft performance and safety of operations, against an aviation standard;
    updating, using the map control interface and based on a second input, at least one of the set of parameters, wherein the second input comprises a set of second updated values for the set of parameters; and
    generating, subsequent to the updating, an updated value of the at least one KPI for display on the GUI,
    wherein the method further comprises:
        activating or deactivating, using the design tool control interface, one or more of the set of design rules.

2. The method of claim 1, wherein the GUI comprises a performance evaluation control interface, and wherein the method further comprises:
    using the performance evaluation control interface to:
        configure the aviation standard, or
        select another aviation standard different from the aviation standard.

3. The method of claim 1, wherein the at least one KPI comprises an indication of airplane performance, an indication of environmental performance, or an indication of system performance for the airspace or the airport system.

4. The method of claim 3, wherein the indication of airplane performance comprises a fuel burn, a distance traveled, a flight time, an engine-out performance, or an all-engine performance.

5. The method of claim 3, wherein the indication of environmental performance comprises a noise level contour map or a measure of emission volume.

6. The method of claim 5, wherein the design configuration comprises a flight segment between a first waypoint and a second waypoint of the one or more waypoints, and wherein the noise level contour map for an area adjacent to the flight segment is computed by measuring a noise impact at a plurality of points along the flight segment, and implementing a Delaunay triangulation followed by a linear interpolation to produce contours of the noise level contour map.

7. The method of claim 3, wherein the indication of system performance comprises an airport runway capacity, an airport taxiway capacity, an airport gate capacity or an airspace sector capacity.

8. The method of claim 1, wherein the aviation standard comprises a standard associated with terminal instrument procedures, a standard associated with performance based navigation instrument procedure design, or a standard associated with procedures of air navigation services and aircraft operations.

9. The method of claim 1, further comprising:
identifying a geometric property associated with the first input; and
assigning, based on the geometric property, at least one aviation-specific property to the first input,
wherein the design configuration is further based on the at least one aviation-specific property.

10. The method of claim 1, wherein the GUI comprises a vertical profile control interface, and wherein the method further comprises:
selecting an element in the map control interface; and
displaying, using the vertical profile control interface, a mileage and an elevation associated with the element.

11. The method of claim 10, wherein the element comprises a route between two waypoints of the one or more waypoints.

12. A system for improving an operation of an airspace or an airport system, comprising:
a processor;
a memory coupled to the processor; and
a graphical user interface (GUI) to accept a first input comprising a set of first updated values for a set of parameters, wherein the set of parameters comprises at least one of: one or more waypoints, a flight plan, weather information, an airport model or procedure, airport obstacle data, or census population data, wherein the GUI comprises a map control interface and a design tool control interface,
wherein the processor is configured to:
produce, based on the first input, a design configuration for the airspace or the airport system based on a parametric model comprising the set of parameters,
generate, based on the first input, a value of at least one key performance indicator (KPI), wherein the at least one KPI comprises a measurable value of an efficacy of a parameter or component of the design configuration and wherein the at least one KPI is provided for display on the GUI,
wherein, prior to generating the value of the at least one KPI, the design configuration is validated, based on a set of design rules and criteria for evaluation of aircraft performance and safety of operations, against an aviation standard,
update, using the map control interface and based on a second input, at least one of the set of parameters, wherein the second input comprises a set of second updated values for the set of parameters, and
generate, subsequent to updating the at least one of the set of parameters, an updated value of the at least one KPI for display on the GUI, wherein the processor is further configured to:
activate or deactivate, using the design tool control interface, one or more of the set of design rules.

13. The system of claim 12, wherein the GUI comprises a performance evaluation control interface, and wherein the processor is further configured to:
use the perform evaluation control interface to:
configure the aviation standard, or
select another aviation standard different from the aviation standard.

14. The system of claim 12, wherein the at least one KPI comprises an indication of airplane performance, an indication of environmental performance, or an indication of system performance for the airspace or the airport system.

15. The system of claim 14, wherein the indication of airplane performance comprises a fuel burn, a distance traveled, a flight time, an engine-out performance, or an all-engine performance.

16. The system of claim 14, wherein the indication of environmental performance comprises a noise level contour map or a measure of emission volume.

17. The system of claim 14, wherein the indication of system performance comprises an airport runway capacity, an airport taxiway capacity, an airport gate capacity or an airspace sector capacity.

18. A non-transitory computer-readable storage medium having instructions stored thereupon for improving an operation of an airspace or an airport system, comprising:
instructions for producing, based on a first input received via a graphical user interface (GUI), a design configuration for the airport or the airport system based on a parametric model comprising a set of parameters, wherein the first input comprises a set of first updated values for the set of parameters, wherein the set of parameters comprises at least one of: a waypoint, a flight plan, weather information, an airport model or procedure, airport obstacle data, or census population data, and wherein the GUI comprises a map control interface and a design tool control interface;
instructions for generating, based on the first input, a value of at least one key performance indicator (KPI), wherein the at least one KPI comprises a measurable value of an efficacy of a parameter or component of the design configuration and wherein the at least one KPI is provided for display on the GUI,
wherein, prior to generating the value of the at least one KPI, the design configuration is validated, based on a set of design rules and criteria for evaluation of aircraft performance and safety of operations, against an aviation standard;
instructions for updating, using the map control interface and based on a second input, at least one of the set of parameters, wherein the second input comprises a set of second updated values for the set of parameters; and
instructions for generating, subsequent to the updating, an updated value of the at least one KPI for display on the GUI,
wherein the non-transitory computer-readable storage medium further comprises:
instructions for activating or deactivating, using the design tool control interface, one or more of the set of design rules.

19. The non-transitory computer-readable storage medium of claim 18, wherein the at least one KPI comprises an indication of airplane performance, an indication of environmental performance, or an indication of system performance for the airspace or the airport system.

20. The non-transitory computer-readable storage medium of claim 19, wherein the indication of airplane performance comprises a fuel burn, a distance traveled, a flight time, an engine-out performance, or an all-engine performance, and wherein the indication of environmental performance comprises a noise level contour map or a measure of emission volume.

\* \* \* \* \*